US012748664B2

(12) United States Patent
Vaka et al.

(10) Patent No.: US 12,748,664 B2
(45) Date of Patent: Sep. 29, 2026

(54) HIGH AVAILABILITY USING VIRTUAL STORAGE CONTROLLERS IN A SCALE OUT STORAGE CLUSTER

(71) Applicant: Microsoft Technology Licensing, LLC, Redmond, WA (US)

(72) Inventors: Pratapa Reddy Vaka, Saratoga, CA (US); Jaspal Kohli, Sunnyvale, CA (US); Hari Krishna Mudaliar, Pleasanton, CA (US); Shwetashree Virajamangala, Cupertino, CA (US); Raju Kurunkad Vasudevan, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 18/335,794

(22) Filed: Jun. 15, 2023

(65) Prior Publication Data

US 2024/0311246 A1 Sep. 19, 2024

Related U.S. Application Data

(60) Provisional application No. 63/490,862, filed on Mar. 17, 2023.

(51) Int. Cl.
*G06F 11/00* (2006.01)
*G06F 11/14* (2006.01)
*G06F 11/20* (2006.01)

(52) U.S. Cl.
CPC ...... *G06F 11/1423* (2013.01); *G06F 11/2028* (2013.01)

(58) Field of Classification Search
CPC ......................... G06F 11/1423; G06F 11/2028
USPC ........................................................ 714/1–57
See application file for complete search history.

(56) References Cited

U.S. PATENT DOCUMENTS

| | | | | |
|---|---|---|---|---|
| 6,651,183 | B1 * | 11/2003 | Gensler, Jr. | G06F 11/0787 714/E11.026 |
| 6,836,830 | B1 * | 12/2004 | Yamagami | G06F 11/1456 714/E11.12 |
| 8,327,186 | B2 * | 12/2012 | Coatney | G06F 11/2033 714/6.3 |
| 9,710,344 | B1 * | 7/2017 | Helmick | G06F 16/273 |
| 10,445,197 | B1 | 10/2019 | Harpreet | |
| 11,748,214 | B2 * | 9/2023 | Agrawal | G06F 11/1451 714/15 |
| 2003/0051187 | A1 * | 3/2003 | Mashayekhi | G06F 11/2035 714/E11.073 |

(Continued)

OTHER PUBLICATIONS

International Search Report and Written Opinion received for PCT Application No. PCT/US2024/018980, Jun. 19, 2024, 15 pages.

*Primary Examiner* — Sarai E Butler
(74) *Attorney, Agent, or Firm* — Alleman Hall LLP

(57) ABSTRACT

Examples are provided for a method of providing access to data of a data center. In one aspect, the method comprises storing a unit of data to each of a plurality of data nodes of a data center, designating a first node of the data center as a primary access node for the unit of data, the primary access node being configured to service access requests to the unit of data using one or more of the plurality of data nodes, determining that the first node is not available, and performing a failover process by reconfiguring a second node of the data center as the primary access node for the unit of data.

17 Claims, 12 Drawing Sheets

(56) References Cited

U.S. PATENT DOCUMENTS

| | | | | |
|---|---|---|---|---|
| 2004/0205377 | A1* | 10/2004 | Nakamura | G06F 11/1494 714/E11.008 |
| 2005/0015657 | A1* | 1/2005 | Sugiura | G06F 11/1482 714/E11.008 |
| 2005/0246393 | A1* | 11/2005 | Coates | G06F 3/067 |
| 2015/0143164 | A1* | 5/2015 | Veerla | G06F 11/2069 714/54 |
| 2016/0085647 | A1* | 3/2016 | Ramasubramaniam | G06F 11/2097 714/4.12 |
| 2016/0098331 | A1* | 4/2016 | Banka | G06F 11/1484 714/6.21 |
| 2016/0188427 | A1* | 6/2016 | Chandrashekar | H04L 67/1034 714/4.11 |
| 2018/0232142 | A1 | 8/2018 | Shekar | |
| 2020/0084142 | A1* | 3/2020 | Bochkar | H04L 47/125 |
| 2021/0279145 | A1* | 9/2021 | Dings | G06F 11/0709 |
| 2021/0303160 | A1 | 9/2021 | Lieblich | |
| 2022/0066811 | A1 | 3/2022 | Zhao | |
| 2022/0164334 | A1* | 5/2022 | Chen | G06F 16/256 |
| 2022/0300387 | A1* | 9/2022 | Rayaraddi | G06F 9/5038 |
| 2023/0236936 | A1* | 7/2023 | Prasad | G06F 11/1469 714/6.3 |

* cited by examiner

HIGH AVAILABILITY USING VIRTUAL STORAGE CONTROLLERS IN A SCALE OUT STORAGE CLUSTER

CROSS REFERENCE TO RELATED APPLICATIONS

This application claims priority to U.S. Provisional Patent Ser. No. 63/490,862, filed Mar. 17, 2023, the entirety of which is hereby incorporated herein by reference for all purposes.

BACKGROUND

High availability in storage systems refers to the ability to provide a high uptime of uninterrupted and seamless operation of storage services for a long period of time, which can include withstanding various failures such as component failures, drive failures, node failures, network failures, or the like. High availability may be determined and quantified by two main factors: MTBF (Mean Time Between Failure) and MTTR (Mean Time to Repair). MTBF refers to the average time between failures of a system. A higher MTBF indicates a longer period of time that the system is likely to remain available. MTTR refers to the average time taken for repairs to make the system available following a failure. A lower MTTR indicates a higher level of system availability. HA may be measured in percentage of time relative to 100%, where 100% implies that a system is always available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In general, this disclosure describes techniques for providing high availability in a data center. In particular, the data center may include two types of nodes associated with storing data: access nodes and data nodes. The access nodes may be configured to provide access to data of a particular volume or other unit of data, while the data nodes may store the data itself (e.g., data blocks and parity blocks for erasure coding, or copies of the data blocks). According to the techniques of this disclosure, a node of the data center may be designated as a secondary access node for a primary access node. In the event that the primary access node fails, the secondary access node may be configured as the new primary access node, and a new secondary access node may be designated, where the new secondary access node is configured for the new primary access node. In this manner, the system may be tolerant to multiple failures of nodes, because new secondary access nodes may be established following the failure of a primary access node.

In one aspect, the method comprises storing a unit of data to each of a plurality of data nodes of a data center, designating a first node of the data center as a primary access node for the unit of data, the primary access node being configured to service access requests to the unit of data using one or more of the plurality of data nodes, determining that the first node is not available, and performing a failover process by reconfiguring a second node of the data center as the primary access node for the unit of data.

The details of one or more examples are set forth in the accompanying drawings and the description below. Other features, objects, and advantages will be apparent from the description and drawings, and from the claims.

DETAILED DESCRIPTION

Figure 1:
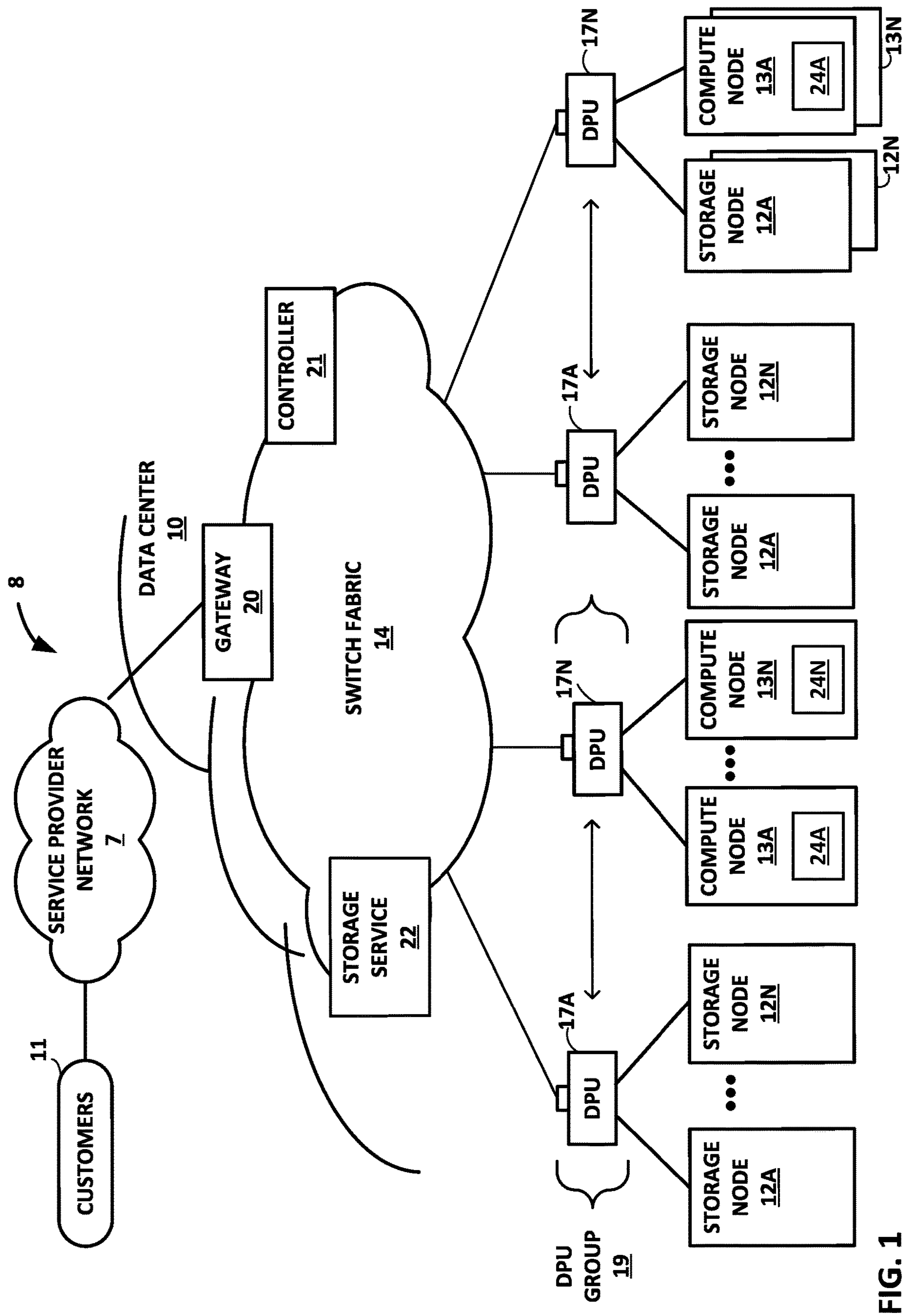
FIG. 1 is a block diagram illustrating an example system having a data center in which examples of the techniques described herein may be implemented.

A high availability (HA) system for storing data in a data center may provide various data durability schemes to implement a fault tolerant system. An example of such schemes includes dual redundancy where redundancy can be provided through duplication for modules and/or components and interfaces within a system. While dual redundancy may improve the availability of a storage system, the system may be unavailable if a component or module and its associated redundant component or module fail at the same time. For example, in a conventional HA system, redundancy mechanisms can be implemented to perform failover using fixed primary and secondary components/modules. In such a system, dual redundancy can be provided for components of the system where, if a primary component is down, a secondary component operating as a backup can perform the tasks that would otherwise have been performed by the primary component. However, such techniques can suffer from system unavailability when both the primary and secondary components fail. In such cases, the system is unavailable until it is serviced and brought back. This is typically true even when a customer has multiple nodes as each node is independent and does not have access to the data in other nodes. Furthermore, the recovery or replacement of failed controllers is typically a manual operation, which results in downtime of the system.

In view of the observations above, this disclosure describes various techniques that can provide an HA system protected against failure of multiple nodes, improving data availability of such systems. Various techniques related to implementing scale out and disaggregated storage clustering using virtual access nodes are provided. Unlike the traditional scale-up storage systems that can only failover between fixed primary and secondary access nodes, the techniques of this disclosure allow for selecting and implementing a new secondary access node in response to a failover, allowing for dynamic designation of access nodes. Furthermore, the techniques of this disclosure enable an automatic handling of failovers without manual intervention. In addition, the repair or replacement of storage access or data nodes can be performed without disruption to customers accessing the data. The techniques of this disclosure offer scalable, more resilient protection to failure than conventional HA techniques. In some examples, a new secondary access can be selected and implemented in response to each subsequent failover, which can (in some cases) be a previous primary access node that has failed and been repaired. Such techniques allow for a higher system availability compared to traditional methods. In some examples, these techniques allow failing a nearly unlimited number of times, limited by the availability of a quorum of storage nodes for hosting a given volume of data. Additionally or alternatively, these techniques can include keeping a secondary access node independent from storage nodes (nodes where data shards are stored in drives, such as solid state drives (SSDs)), which allows the failover to remain unaffected by any ongoing rebuilds due to one or more storage nodes failing. These techniques may be applicable to a variety of storage services, such as block storage, object storage, and file storage.

FIG. 1 is a block diagram illustrating an example system 8 having a data center 10 in which examples of the techniques described herein may be implemented. In general, data center 10 provides an operating environment for applications and services for customers 11. Data center 10 may, in some examples, host infrastructure equipment, such as compute nodes, networking and storage systems, redundant power supplies, and environmental controls. Customers 11 can be coupled to data center 10 through various ways. In the example of FIG. 1, customers 11 is coupled to data center 10 by content/service provider network 7 and gateway device 20. In some examples, content/service provider network 7 may be a data center wide-area network (DC WAN), private network, or any other type of network. Content/service provider network 7 may be coupled to one or more networks administered by other providers and may thus form part of a large-scale public network infrastructure (e.g., the Internet).

In some examples, data center 10 may represent one of many geographically distributed network data centers. Data center 10 may provide various services, such as information services, data storage, virtual private networks, file storage services, data mining services, scientific- or super-computing services, host web services, etc. Customers 11 may be individuals or collective entities, such as enterprises and governments. For example, data center 10 may provide services for several enterprises and end users.

In the example of FIG. 1, data center 10 includes a set of storage nodes 12 and a set of compute nodes 13 interconnected via a high-speed switch fabric 14. In some examples, storage nodes 12 and compute nodes 13 are arranged into multiple different groups, each including any number of nodes up to, for example, N storage nodes 12 and N compute nodes 13. As used throughout this disclosure, "N" (or any other variable representing a countable number, such as "M" and "X") may be different in each instance. For example, N may be different for storage nodes 12 and compute nodes 13. Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

In the example of FIG. 1, system 8 includes software-defined networking (SDN) controller 21, which provides a high-level controller for configuring and managing the routing and switching infrastructure of data center 10. SDN controller 21 provides a logically and, in some cases, physically centralized controller for facilitating operation of one or more virtual networks within data center 10. In some examples, SDN controller 21 may operate in response to configuration input received from a network administrator.

In some examples, SDN controller 21 operates to configure data processing units (DPUs) 17 to logically establish one or more virtual fabrics as overlay networks dynamically configured on top of the physical underlay network provided by switch fabric 14. For example, SDN controller 21 may learn and maintain knowledge of DPUs 17 and establish a communication control channel with each DPU 17. SDN controller 21 may use its knowledge of DPUs 17 to define multiple sets (DPU groups 19) of two of more DPUs 17 to establish different virtual fabrics over switch fabric 14. More specifically, SDN controller 21 may use the communication control channels to notify each DPU 17 which other DPUs 17 are included in the same set. In response, each DPU 17 may dynamically set up FCP tunnels with the other DPUs 17 included in the same set as a virtual fabric over a packet-switched network. In this way, SDN controller 21 may define the sets of DPUs 17 for each of the virtual fabrics, and the DPUs can be responsible for establishing the virtual fabrics. As such, underlay components of switch fabric 14 may be unaware of virtual fabrics.

DPUs 17 may interface with and utilize switch fabric 14 so as to provide full mesh (any-to-any) interconnectivity between DPUs 17 of any given virtual fabric. In this way, the servers connected to any of the DPUs 17 of a given virtual fabric may communicate packet data for a given packet flow to any other of the servers coupled to the DPUs 17 for that virtual fabric. Further, the servers may communicate using any of a number of parallel data paths within switch fabric 14 that interconnect the DPUs 17 of said virtual fabric. More details of DPUs operating to spray packets within and across virtual overlay networks are available in U.S. Provisional Patent Application No. 62/638,788, filed Mar. 5, 2018, entitled "NETWORK DPU VIRTUAL FABRICS CONFIGURED DYNAMICALLY OVER AN UNDERLAY NETWORK" and U.S. patent application Ser. No. 15/939,227, filed Mar. 28, 2018, entitled "NON-BLOCKING ANY-TO-ANY DATA CENTER NETWORK WITH PACKET SPRAYING OVER MULTIPLE ALTERNATE DATA PATHS", the contents of which are incorporated herein by reference in their entireties for all purposes.

Data center 10 further includes storage service 22. In general, storage service 22 may configure various DPU groups 19 and storage nodes 12 to provide high availability (HA) for data center 10. For a given customer 11, one of storage nodes 12 (e.g., storage node 12A) may be configured as an access node, and one or more other nodes of storage nodes 12 (e.g., storage node 12N) may be configured as data nodes. In general, an access node provides access to a volume (i.e., a logical unit of data) for the given customer 11, and data nodes may store data of the volume for redundancy but otherwise not used to access the data for the given customer 11 (while acting as data nodes).

Storage service 22 may be responsible for access to various durable volumes of data from customers 11. For example, storage service 22 may be responsible for creating/deleting/mounting/unmounting/remounting various durable volumes of data from customers 11. Storage service 22 may designate one of storage nodes 12 as a primary access node for a durable volume. The primary access node may be the only one of storage nodes 12 that is permitted to direct data nodes of storage nodes 12 with respect to storing data for the durable volume. At any point of time, the storage service 22 ensures that only one access node can communicate with the data nodes for a given volume. In this manner, these techniques may ensure data integrity and consistency in split brain scenarios.

Each of storage nodes 12 may be configured to act as either an access node, a data node, or both for different volumes. For example, storage node 12A may be configured as an access node for a durable volume associated with a first customer 11 and as a data node for a durable volume associated with a second customer 11. Storage node 12N may be configured as a data node for the durable volume associated with the first customer 11 and as an access node for the durable volume associated with the second customer 11.

Storage service 22 may associate each durable volume with a relatively small number of storage nodes 12 (compared to N storage nodes 12). If one or more of the storage nodes 12 of a given durable volume goes down, a new, different set of storage nodes 12 may be associated with the durable volume. For example, storage service 22 may monitor the health of each of storage nodes 12 and initiate failover for corresponding durable volumes in response to detecting a failed node.

Storage service 22 may periodically monitor the health of storage nodes 12 for various purposes. For example, storage service 22 may receive periodic heartbeat signals from each storage node 12. When network connectivity is lost by a storage node 12 (or when a storage node 12 crashes), storage service 22 can miss the heartbeat signal from said storage node 12. In response, storage service 22 may perform an explicit health check on the node to confirm whether the node is not reachable or has failed. When storage service 22 detects that the health of an access node is below a predetermined threshold (e.g., the access node is in the process of failing or has in fact failed), storage service 22 may initiate a failover process. For example, storage service 22 may configure one of the data nodes or a secondary access node as a new primary access node for the volume such that access requests from the associated customer 11 are serviced by the new primary access node, thereby providing high availability. Thus, access requests may be serviced by the new primary access node without delaying the access requests, because data of the volume need not be relocated prior to servicing the access requests. In some cases, storage service 22 may copy data of the volume to another storage node 12 that was not originally configured as a data node for the volume in order to maintain a sufficient level of redundancy for the volume (e.g., following a failover).

Accordingly, storage service 22 may allow for failover of a durable volume in a scale out and disaggregated storage cluster. As long as there are a sufficient number of storage nodes 12 to host the durable volume, storage services may perform such failover as many times as needed without disrupting access to the durable volume. Moreover, failover may be achieved without relocating data of the durable volume, unless one of the data nodes is also down. Thus, failover may occur concurrently with or separately from rebuilding of data for the volume. In this manner, storage service 22 may provide high availability even when some of storage nodes 12 containing data for the durable volume have failed either during or following the failover.

Data center 10 further includes storage initiators 24, each of which is a component (software or a combination of software/hardware) in a compute node 13. Customers 11 may request access to a durable volume (e.g., read, write, or modify data of the durable volume) via a storage initiator 24. A storage initiator 24 may maintain information associating the storage node(s) 12 configured as an access node for each durable volume. Thus, when a new node is selected as either a new primary access node or a secondary access node, storage service 22 may send data representing the new primary access node and/or secondary access node to the appropriate storage initiator 24. In this manner, customers 11 need not be informed of failovers or precise locations of data for their durable volumes.

In some examples, a primary storage node (also referred to herein as an "primary access node") may be independent of storage nodes 12. For example, the primary storage node may be one of storage nodes 12. In response to a request to access data of a volume, the primary storage node may send a request to read, write, or modify data to/from a data node of storage nodes 12 associated with the volume.

Although not shown in FIG. 1, data center 10 may also include, in some examples, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

As further described herein, in some examples, each DPU 17 is a highly programmable I/O processor specially designed for offloading certain functions from storage nodes 12 and compute nodes 13. In some examples, each DPU 17 includes one or more processing cores consisting of a number of internal processor clusters, e.g., MIPS cores, equipped with hardware engines that offload cryptographic functions, compression and regular expression (RegEx) processing, data storage functions, and networking operations. In this way, each DPU 17 includes components for fully implementing and processing network and storage stacks on behalf of one or more storage nodes 12 or compute nodes 13. In addition, DPUs 17 may be programmatically configured to serve as a security gateway for its respective storage nodes 12 or compute nodes 13, freeing up the processors of the servers to dedicate resources to application workloads.

In some example implementations, each DPU 17 may be viewed as a network interface subsystem that implements full offload of the handling of data packets (with zero copy in server memory) and storage acceleration for the attached server systems. In some examples, each DPU 17 may be implemented as one or more application-specific integrated circuit (ASIC) or other hardware and software components, each supporting a subset of the servers. DPUs 17 may also be referred to as access nodes or devices including access nodes. In other words, the term access node may be used herein interchangeably with the term DPU. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the contents of which are incorporated herein by reference in their entireties for all purposes.

In some examples, DPUs 17 are configurable to operate in a standalone network appliance having one or more DPUs 17. For example, DPUs 17 may be arranged into multiple different DPU groups 19, each including any number of DPUs 17 up to, for example, N DPUs 17. As described above, the number N of DPUs 17 may be different than the number N of storage nodes 12 or the number N of compute nodes 13. Multiple DPUs 17 may be grouped (e.g., within a single electronic device or network appliance), referred to herein as a DPU group 19, for providing services to a group of servers supported by the set of DPUs 17 internal to the device. In some examples, a DPU group 19 may comprise four DPUs 17, each supporting four servers so as to support a group of sixteen servers.

In the example of FIG. 1, each DPU 17 provides connectivity to switch fabric 14 for a different group of storage nodes 12 and/or compute nodes 13 and may be assigned respective IP addresses and provide routing operations for the storage nodes 12 or compute nodes 13 coupled thereto. DPUs 17 may provide routing and/or switching functions for communications from/directed to the individual storage nodes 12 or compute nodes 13. For example, each DPU 17 can include a set of edge-facing electrical or optical local bus interfaces for communicating with a respective group of storage nodes 12 and/or compute nodes 13 and one or more core-facing electrical or optical interfaces for communicating with core switches within switch fabric 14. In addition, DPUs 17 may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the servers. Although not shown in FIG. 1, DPUs 17 may be directly coupled to each other within a DPU group 19 to provide direct interconnectivity. In some examples, a DPU 17 may be directly coupled to one or more DPUs outside its DPU group 19.

In some examples, each DPU group 19 may be configured as a standalone network device and may be implemented as a two rack unit (2RU) device that occupies two rack units (e.g., slots) of an equipment rack. In some examples, DPU 17 may be integrated within a server, such as a single 1RU server in which four CPUs are coupled to the forwarding ASICs described herein on a motherboard deployed within a common computing device. In some examples, one or more of DPUs 17, storage nodes 12, and/or compute nodes 13 may be integrated in a suitable size (e.g., 10RU) frame that may become a network storage compute unit (NSCU) for data center 10. For example, a DPU 17 may be integrated within a motherboard of a storage node 12 or a compute node 13 or otherwise co-located with a server in a single chassis.

In some examples, DPUs 17 interface and utilize switch fabric 14 so as to provide full mesh (any-to-any) interconnectivity such that any of storage nodes 12 and/or compute nodes 13 may communicate packet data for a given packet flow to any other server using any of a number of parallel data paths within the data center 10. For example, in some example network architectures, DPUs 17 spray individual packets for packet flows among the other DPUs 17 across some or all of the multiple parallel data paths in the switch fabric 14 of data center 10 and reorder the packets for delivery to the destinations so as to provide full mesh connectivity.

A data transmission protocol referred to as a Fabric Control Protocol (FCP) may be used by the different operational networking components of any of the DPUs 17 to facilitate communication of data across switch fabric 14. The use of FCP may provide certain advantages. For example, the use of FCP may significantly increase the bandwidth utilization of the underlying switch fabric 14. Moreover, in example implementations described herein, the servers of the data center may have full mesh interconnectivity and may nevertheless be non-blocking and drop-free.

FCP is an end-to-end admission control protocol in which, in some examples, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, which may provide numerous advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication, and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference for all purposes.

Although DPUs 17 are described in FIG. 1 with respect to switch fabric 14 of data center 10, DPUs 17 may provide full mesh interconnectivity over any packet switched network. For example, DPUs 17 may provide full mesh interconnectivity over a local area network (LAN), a wide area network (WAN), or a collection of one or more networks. The packet switched network may have any topology, e.g., flat or multi-tiered, which can include topologies where there is full connectivity between the DPUs 17. The packet switched network may use any technology, including IP over Ethernet as well as other technologies. Irrespective of the type of packet switched network, DPUs 17 may spray individual packets for packet flows between the DPUs 17 and across multiple parallel data paths in the packet switched network and reorder the packets for delivery to the destinations so as to provide full mesh connectivity.

Figure 2:
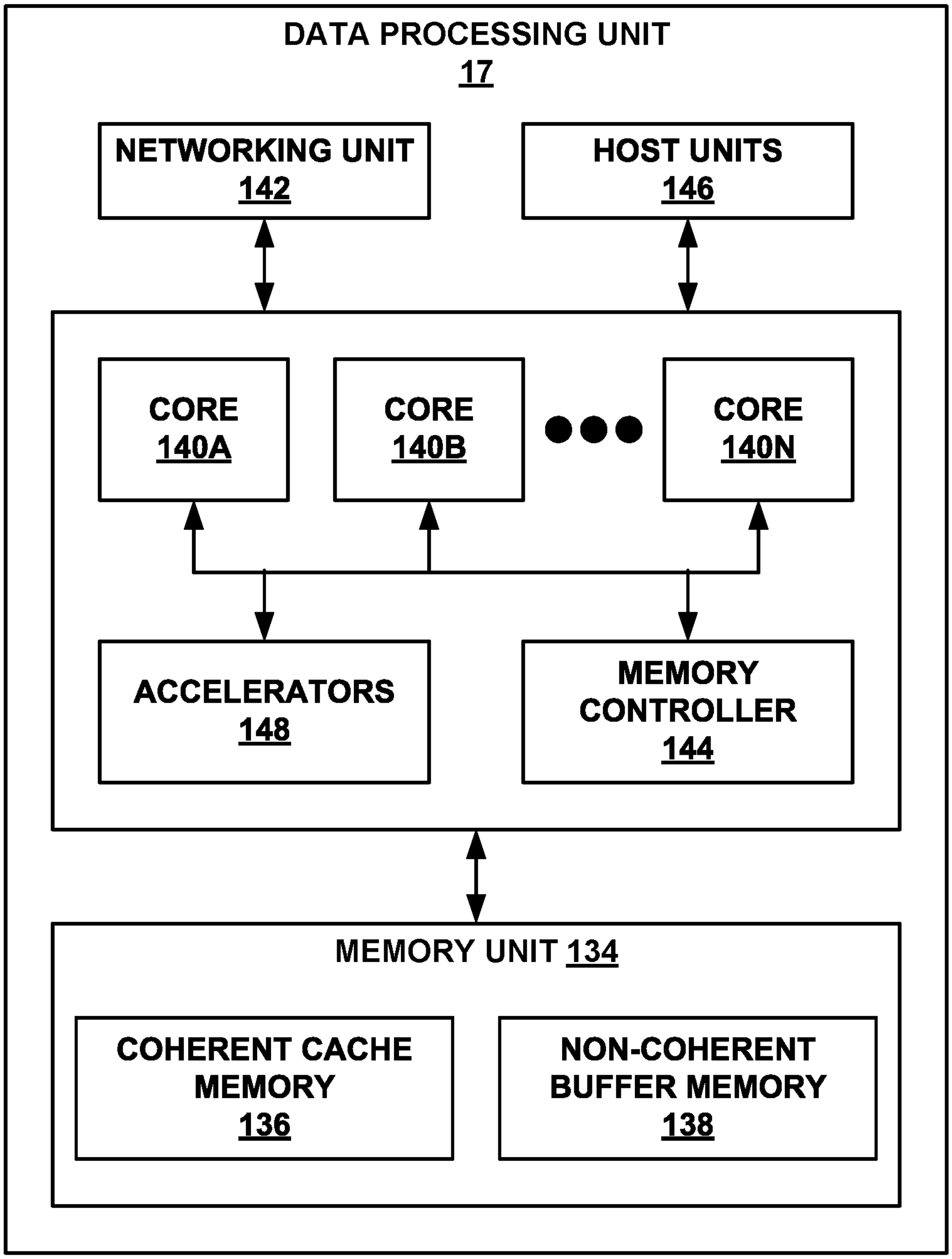
FIG. 2 is a block diagram illustrating an example data processing unit.

FIG. 2 is a block diagram illustrating an example data processing unit, such as DPU 17 of FIG. 1, in further detail. DPU 17 generally represents a hardware chip implemented in digital logic circuitry. DPU 17 may be communicatively coupled to a CPU, a GPU, one or more network devices, server devices, random access memory, storage media (e.g., SSDs), a data center fabric, or the like through various means (e.g., via PCI-e, Ethernet (wired or wireless), or other such communication media).

In the illustrated example of FIG. 2, DPU 17 includes a plurality of programmable processing cores 140A-140N ("cores 140") and a memory unit 134. The DPU 17 may include any number of cores 140. In some examples, the plurality of cores 140 includes more than two processing cores. In some examples, the plurality of cores 140 includes six processing cores. Memory unit 134 may include two types of memory or memory devices, namely coherent cache memory 136 and non-coherent buffer memory 138. DPU 17 also includes a networking unit 142, one or more PCIe interfaces 146, a memory controller 144, and one or more accelerators 148. As illustrated in the example of FIG. 2, each of the cores 140, networking unit 142, memory controller 144, PCIe interfaces 146, accelerators 148, and memory unit 134 including coherent cache memory 136 and non-coherent buffer memory 138 are communicatively coupled to each other.

In the example of FIG. 2, DPU 17 represents a high performance, hyper-converged network, storage, and data processor and input/output hub. The plurality of cores 140 may comprise one or more of MIPS (microprocessor without interlocked pipeline stages) cores, ARM (advanced RISC (reduced instruction set computing) machine) cores, PowerPC (performance optimization with enhanced RISC—performance computing) cores, RISC-V (RISC five) cores, or CISC (complex instruction set computing or x86) cores. Each of the cores 140 may be programmed to process one or more events or activities related to a given data packet such as, for example, a networking packet or a storage packet. Each of the cores 140 may be programmable using a high-level programming language, e.g., C, C++, or the like.

As described herein, the new processing architecture utilizing a DPU may be efficient for stream processing applications and environments compared to previous systems. For example, stream processing is a type of data processing architecture well-suited for high performance and high efficiency processing. A stream is defined as an ordered, unidirectional sequence of computational objects that can be of unbounded or undetermined length. In a simple example, a stream originates from a producer and terminates at a consumer and is operated on sequentially. In some examples, a stream can be defined as a sequence of stream fragments, where each stream fragment includes a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing can consume segments (fragments) to produce an ordered byte stream. The reverse processing can be performed in the transmit (Tx) direction. Independently of the stream type, stream manipulation can involve efficient fragment manipulation.

In some examples, the plurality of cores 140 may be capable of processing a plurality of events related to each data packet of one or more data packets, which can be received by networking unit 142 and/or PCIe interfaces 146, in a sequential manner using one or more "work units." In general, work units are sets of data exchanged between cores 140 and networking unit 142 and/or PCIe interfaces 146 where each work unit may represent one or more of the events related to a given data packet of a stream. As one example, a work unit (WU) can be a container that is associated with a stream state and used to describe (e.g., point to) data within a stream (stored). For example, work units may dynamically originate within a peripheral unit coupled to the multi-processor system (e.g., injected by a networking unit, a host unit, or a solid-state drive interface), or within a processor itself, in association with one or more streams of data and terminate at another peripheral unit or another processor of the system. The work unit can be associated with an amount of work that is relevant to the entity executing the work unit for processing a respective portion of a stream.

One or more processing cores of a DPU may be configured to execute program instructions using a work unit stack containing a plurality of work units. In some examples, in processing the plurality of events related to each data packet, a first core 140 (e.g., core 140A) may process a first event of the plurality of events. Moreover, first core 140A may provide to a second core 140 (e.g., core 140B) a first work unit. Furthermore, second core 140B may process a second event of the plurality of events in response to receiving the first work unit from first core 140A.

DPU 17 may act as a combination of a switch/router and a number of network interface cards. For example, networking unit 142 may be configured to receive one or more data packets from, and to transmit one or more data packets to, one or more external devices (e.g., network devices). Networking unit 142 may perform network interface card functionality, packet switching, etc. and may use large forwarding tables and offer programmability. Networking unit 142 may expose Ethernet ports for connectivity to a network, such as network 7 of FIG. 1. In this way, DPU 17 may support one or more high-speed network interfaces (e.g., Ethernet ports) without the need for a separate network interface card (NIC). Each of PCIe interfaces 146 may support one or more interfaces (e.g., PCIe ports) for connectivity to an application processor (e.g., an x86 processor of a server device or a local CPU or GPU of the device hosting DPU 17) or a storage device (e.g., an SSD). DPU 17 may also include one or more high bandwidth interfaces for connectivity to off-chip external memory (not illustrated in FIG. 2). Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like.

Memory controller 144 may control access to memory unit 134 by cores 140, networking unit 142, and any number of external devices (e.g., network devices, servers, external storage devices, or the like). Memory controller 144 may be configured to perform a number of operations to perform memory management. For example, memory controller 144 may be capable of mapping accesses from one of the cores 140 to either coherent cache memory 136 or non-coherent buffer memory 138. In some examples, memory controller 144 may map the accesses based on one or more of an address range, an instruction or an operation code within the instruction, a special access, or a combination thereof.

Additional details regarding the operation and advantages of DPUs are available in U.S. patent application Ser. No. 16/031,921, filed Jul. 10, 2018, and titled "DATA PROCESSING UNIT FOR COMPUTE NODES AND STORAGE NODES," and U.S. patent application Ser. No. 16/031,676, filed Jul. 10, 2018, and titled "ACCESS NODE FOR DATA CENTERS", the contents of which are incorporated herein by reference in their entireties for all purposes.

Figure 3:
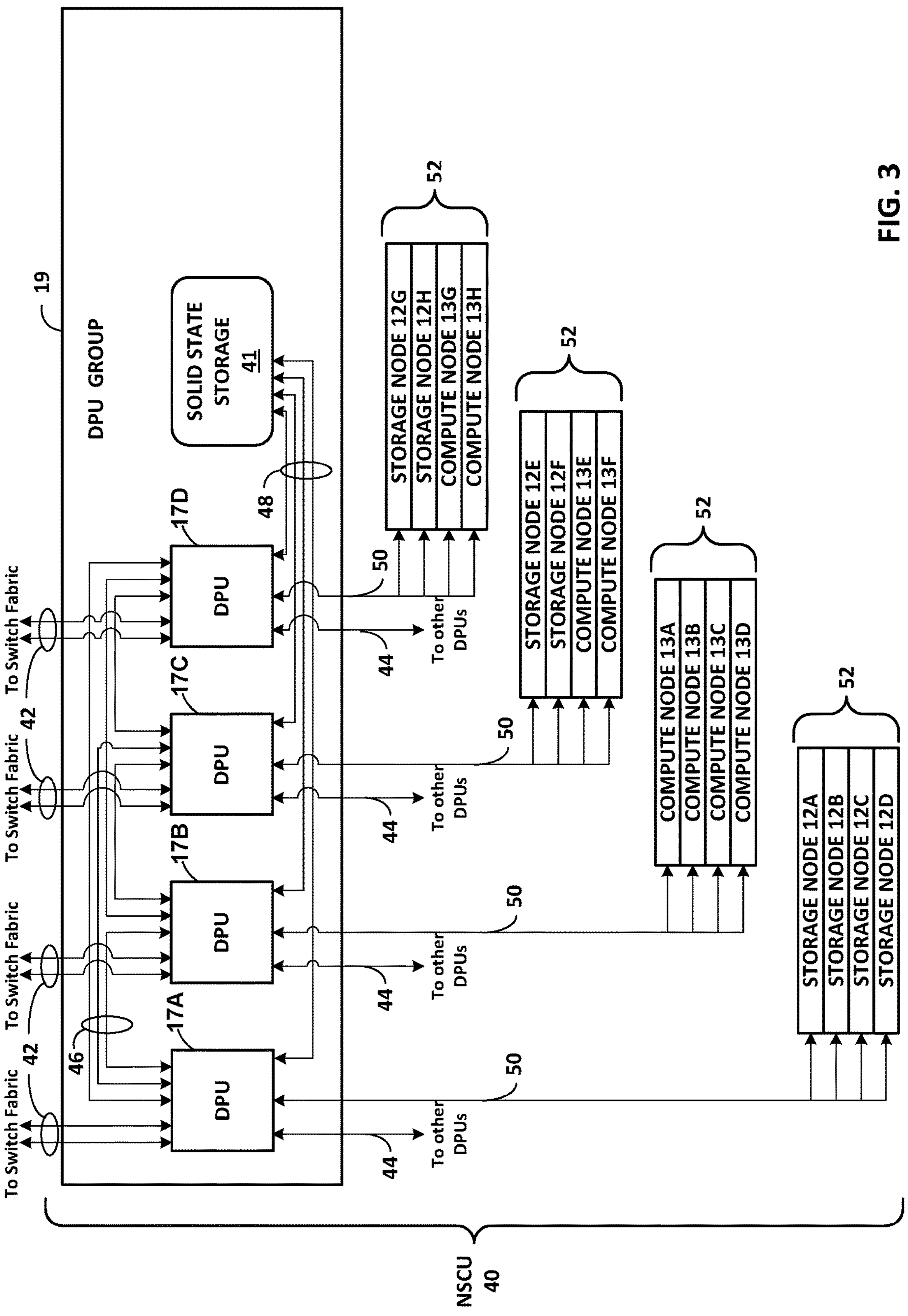
FIG. 3 is a block diagram illustrating an example of a network storage compute unit including a data processing unit group and its supported node group.

FIG. 3 is a block diagram illustrating an example of a network storage compute unit 40 including a data processing unit group 19 and its supported node group 52. DPU group 19 may be configured to operate as a high-performance I/O hub designed to aggregate and process network and storage I/O to multiple node groups 52. A DPU group 19 may include any number of DPUs 17, each of which can be associated with a different node group 52. In the example of FIG. 3, DPU group 19 includes four DPUs 17A-17D connected to a pool of local solid-state storage 41. Each DPU 17 may support any number and combination of storage nodes 12 and compute nodes 13. In the illustrated example, DPU group 19 supports a total of eight storage nodes 12A-12H and eight compute nodes 13A-13H, where each of the four DPUs 17 within DPU group 19 supports four storage nodes 12 and/or compute nodes 13. The four nodes may be any combination of storage nodes 12 and/or compute nodes 13 (e.g., four storage nodes 12 and zero compute nodes 13, two storage nodes 12 and two compute nodes 13, one storage node 12 and three compute nodes 13, zero storage nodes 12 and four compute nodes 13, etc.). In some examples, each of the four storage nodes 12 and/or compute nodes 13 may be arranged as a node group 52. The "storage nodes 12" or "compute nodes 13" described throughout this application may be dual-socket or dual-processor "storage nodes" or "compute nodes" that are arranged in groups of two or more within a standalone device (e.g., node group 52).

Although DPU group 19 is illustrated in FIG. 3 as including four DPUs 17 that are all connected to a single pool of solid-state storage 41, a DPU group 19 may be arranged in other ways. In some examples, each of the four DPUs 17 may be included on an individual DPU sled that also includes solid-state storage and/or other types of storage for the DPU 17. For example, a DPU group 19 may include four DPU sleds each having a DPU 17 and a set of local storage devices. In some examples, hard drive storage is used instead of solid-state storage.

In the example of FIG. 3, DPUs 17 within DPU group 19 connect to solid-state storage 41 and node groups 52 using Peripheral Component Interconnect express (PCIe) links 48 and 50, respectively, and connect to the datacenter switch fabric 14 and other DPUs 17 using Ethernet links. For example, each of DPUs 17 may support six high-speed Ethernet connections, including two externally available Ethernet connections 42 for communicating with the switch fabric, one externally available Ethernet connection 44 for communicating with other DPUs 17 in other DPU groups 19, and three internal Ethernet connections 46 for communicating with other DPUs 17 in the same DPU group 19. In some examples, each externally available connection may be a 100 Gigabit Ethernet (GE) connection. In the example of FIG. 3, DPU group 19 has 8×100 GE externally available ports to connect to the switch fabric 14.

Within DPU group 19, connections 42 may be copper (e.g., electrical) links arranged as 8×25 GE links between each of DPUs 17 and optical ports of DPU group 19. Between DPU group 19 and the switch fabric, connections 42 may be optical Ethernet connections coupled to the optical ports of DPU group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to DPU group 19 may carry 4×100 GE optical fibers with each fiber carrying optical signals at four different wavelengths or lambdas. In other examples, the externally available connections 42 may remain as electrical Ethernet connections to the switch fabric.

In the example of FIG. 3, each DPU 17 includes one Ethernet connection 44 for communication with other DPUs 17 within other DPU groups 19, and three Ethernet connections 46 for communication with the other three DPUs 17 within the same DPU group 19. In some examples, connections 44 may be referred to as "inter-DPU group links" and connections 46 may be referred to as "intra-DPU group links." Ethernet connections 44, 46 can provide full-mesh connectivity between DPUs 17 within a given structural unit. A structural unit may be referred to herein as a logical rack (e.g., a half-rack or a half physical rack). A structural unit may include any number of NSCUs 40. In some examples, a structural unit includes two NSCUs 40 and supports an 8-way mesh of eight DPUs 17, where each NSCU 40 includes a DPU group 19 of four DPUs 17. In such examples, connections 46 could provide full-mesh connectivity between DPUs 17 within the same DPU group 19 and connections 44 could provide full-mesh connectivity between each DPU 17 and four other DPUs 17 within another DPU group 19 of the logical rack (structural unit). A DPU group 19 may be implemented to have the requisite number of externally available Ethernet ports to provide such connectivity. In the examples described above, a DPU group 19 may have at least sixteen externally available Ethernet ports for its four DPUs 17 to connect to the four DPUs 17 in the other DPU group 19.

In some examples, an 8-way mesh of DPUs 17 (e.g., a logical rack of two NSCUs 40) can be implemented where each DPU 17 may be connected to each of the other seven DPUs 17 by a 50 GE connection. For example, each of connections 46 between DPUs 17 within the same DPU group 19 may be a 50 GE connection arranged as 2×25 GE links. Each of connections 44 between a DPU 17 of a DPU group 19 and the DPUs 17 in the other DPU group 19 may include four 50 GE links. In some examples, each of the 50 GE links may be arranged as 2×25 GE links such that each of connections 44 includes 8×25 GE links.

In some examples, Ethernet connections 44, 46 provide full-mesh connectivity between DPUs within a given structural unit that is a full-rack or a full physical rack that includes four NSCUs 40 having four DPU groups 19 and supports a 16-way mesh of DPUs 17 for said DPU groups 19. In such examples, connections 46 can provide full-mesh connectivity between DPUs 17 within the same DPU group 19, and connections 44 can provide full-mesh connectivity between each DPU 17 and twelve other DPUs 17 within three other DPU groups 19. A DPU group 19 may be implemented to have the requisite number of externally available Ethernet ports to provide such connectivity. In the examples described above, a DPU group 19 may have at least forty-eight externally available Ethernet ports to connect to the DPUs 17 in the other DPU groups 19.

In the case of a 16-way mesh of DPUs 17, each DPU 17 may be connected to each of the other fifteen DPUs by a 25 GE connection, for example. Each of connections 46 between DPUs 17 within the same DPU group 19 may be a single 25 GE link. Each of connections 44 between a DPU 17 of a DPU group 19 and the DPUs 17 in the three other DPU groups 19 may include 12×25 GE links.

As shown in FIG. 3, each DPU 17 within a DPU group 19 may also support high-speed PCIe connections 48, 50 (e.g., PCIe Gen 3.0 or PCIe Gen 4.0 connections) for communication with solid state storage 41 within DPU group 19 and communication with node groups 52 within NSCU 40, respectively. In the example of FIG. 3, each node group 52 includes four storage nodes 12 and/or compute nodes 13 supported by a DPU 17 within DPU group 19. Solid state storage 41 may be a pool of Non-Volatile Memory express (NVMe)-based SSD storage devices accessible by each DPU 17 via connections 48.

Solid-state storage 41 may include any number of storage devices with any amount of storage capacity. In some examples, solid state storage 41 may include twenty-four SSD devices with six SSD devices for each DPU 17. The twenty-four SSD devices may be arranged in four rows of six SSD devices with each row of SSD devices being connected to a DPU 17. Each of the SSD devices may provide up to 16 Terabytes (TB) of storage for a total of 384 TB per DPU group 19. As described in more detail below, in some cases, a physical rack may include four DPU groups 19 and their supported node groups 52. In that case, a typical physical rack may support approximately 1.5 Petabytes (PB) of local solid-state storage. In some examples, solid-state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like. As can readily be appreciated, various combinations of such devices may also be implemented.

In examples where each DPU 17 is included on an individual DPU sled with local storage for the DPU 17, each of the DPU sleds may include four SSD devices and some additional storage that may be hard drive or solid-state drive devices. The four SSD devices and the additional storage may provide approximately the same amount of storage per DPU 17 as the six SSD devices described in the previous examples.

In some examples, each DPU 17 supports a total of 96 PCIe lanes. In such examples, each of connections 48 may be an 8×4-lane PCI Gen 3.0 connection via which each DPU 17 may communicate with up to eight SSD devices within solid state storage 41. In addition, each of connections 50 between a given DPU 17 and the four storage nodes 12 and/or compute nodes 13 within the node group 52 supported by the given DPU 17 may be a 4×16-lane PCIe Gen 3.0 connection. In these examples, DPU group 19 has a total of 256 external-facing PCIe links that interface with node groups 52. In some scenarios, DPUs 17 may support redundant server connectivity such that each DPU 17 connects to eight storage nodes 12 and/or compute nodes 13 within two different node groups 52 using an 8×8-lane PCIe Gen 3.0 connection.

In some examples, each of DPUs 17 supports a total of 64 PCIe lanes. In such examples, each of connections 48 may be an 8×4-lane PCI Gen 3.0 connection via which each DPU 17 may communicate with up to eight SSD devices within solid state storage 41. In addition, each of connections 50 between a given DPU 17 and the four storage nodes 12 and/or compute nodes 13 within the node group 52 supported by the given DPU 17 may be a 4×8-lane PCIe Gen 4.0 connection. In these examples, DPU group 19 has a total of 128 external facing PCIe links that interface with node groups 52.

Figure 4:
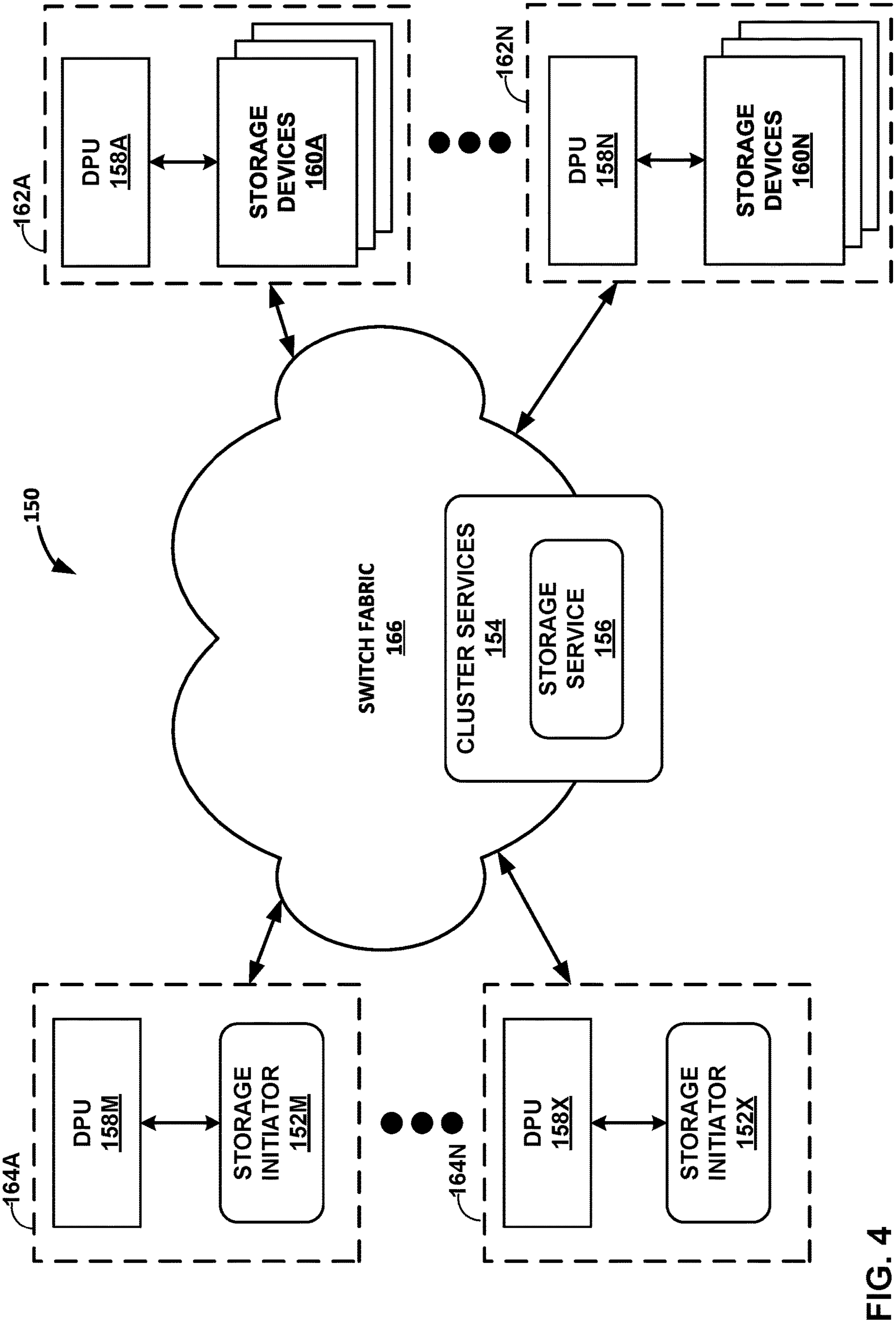
FIG. 4 is a block diagram illustrating an example storage cluster.

FIG. 4 is a block diagram illustrating an example storage cluster 150. Storage cluster 150 includes cluster services 154, storage nodes 162, and compute nodes 164. The storage cluster 150 may include any number of storage nodes 162 and/or compute nodes 164. Each storage node 162 includes a set of storage devices 160 (e.g., SSDs) coupled to a respective DPU 158 (e.g., storage devices 160A are coupled to DPU 158A). Each compute node 164 includes one or more instances of a storage initiator 152 coupled to a respective DPU 158. A storage initiator 152 may have offloading capabilities. Storage initiator 152 may correspond to storage initiator 24 of FIG. 1. Cluster services 154 include storage service 156, which may correspond to storage service 22 of FIG. 1. Cluster services 154 may perform various storage control plane operations using storage service 156. DPUs 158 may correspond to DPUs 17 of DPU groups 19 of FIG. 1. Each of the various components of storage cluster 150 is connected via switch fabric 166, which may correspond to switch fabric 14 of FIG. 1. In some examples, each of the various components of storage cluster 150 is connected via an IP/Ethernet-based network.

In the example of FIG. 4, storage cluster 150 represents an example of a scale out and distributed storage cluster. Storage cluster 150 may allow for disaggregation and composition of storage in data centers, such as data center 10 of FIG. 1. Cluster services 154 may be executed by a set of nodes or virtual machines (VMs). Cluster services 154 may manage storage cluster 150 and provide an application programming interface (API) for data center orchestration systems. Cluster services 154 may compose and establish volumes per user requests received from a storage initiator 152 of compute nodes 164. For example, storage services 156 may be used to compose and establish such volumes. Cluster services 154 may also provide other services, such as rebuilds, recovery, error handling, telemetry, alerts, failover of volumes, or the like. Cluster services 154 may itself be built with redundancy for high availability.

Each storage node 162 includes a set of one or more communicatively-coupled storage devices 160 to store data. Each storage device 160 coupled to a respective DPU 158 may be virtualized and presented as volumes to a storage initiator 152 through virtual storage controllers. As such, reads and writes issued by a storage initiator 152 may be served by storage nodes 162. The data for a given volume may be stored in a small subset of storage nodes 162 (e.g., 6 to 12 nodes) for providing durability. Storage nodes 162 that contain the data for a volume may be referred to as "data nodes" for that volume. For a given volume, one of the storage nodes 162 may serve as an access node to which a storage initiator 152 sends input/output (IO) requests. The access node is responsible for reading/writing the data from/to the data nodes and responding to requests from a storage initiator 152. A given storage node 162 may serve as an access node for some volumes and as a data node for other volumes.

Figure 5:
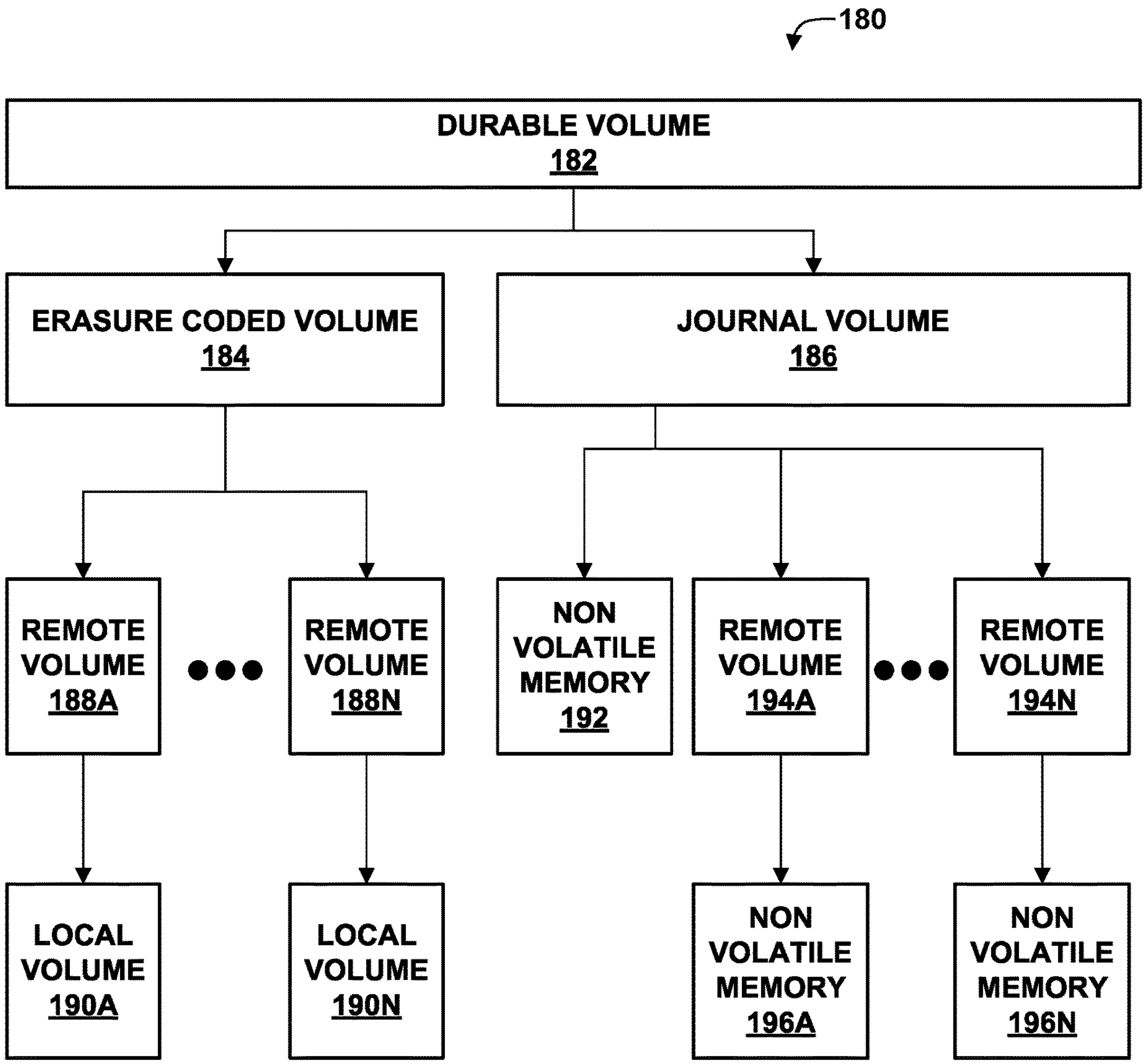
FIG. 5 is a conceptual diagram illustrating an example architecture for storing data of a durable volume.

FIG. 5 is a conceptual diagram illustrating an example architecture 180 for storing data of a durable volume. As shown, architecture 180 includes durable volume 182, which is realized using erasure coded volume 184 and journal volume 186. Erasure coded volume 184 generally represents the actual data stored by a customer 11 (FIG. 1). Journal volume 186 generally represents data for how to store data of erasure coded volume 184 for durable volume 182 and to acknowledge to a storage initiator (such as storage initiator 24 of FIG. 1 or storage initiator 152 of FIG. 4) before it is erasure coded and stored in data nodes. As such, the journal volume 186 can be used to ensure that acknowledged writes are flushed to the erasure coded volume 184 during a failover process. Journal volume 186 can be associated with access nodes, where the access nodes (including primary access nodes and secondary access nodes) each include a copy of the journal volume 186 to prevent data corruption. Erasure coded volume 184 may be stored in one or more remote volumes 188, which store data in respective local volumes 190. Data of journal volume 186 may be stored in non-volatile memory 192 and one or more remote volumes 194, which may be stored in a respective non-volatile memory 196. Other storage schemes can be logically implemented. For example, in some implementations, erasure coded volume 184 is stored in one or more local volumes 190.

Data of a volume may be made durable by using erasure coding or replication. Other data redundancy schemes may also be implemented. When using erasure coding (EC) for a durable volume, parity blocks may be calculated for a group of data blocks. These blocks may be stored in a different storage node. These nodes may be the data nodes of the corresponding volume. EC is generally more efficient in terms of additional network traffic between storage nodes and storage overhead for required redundancy. Because redundancy may be created through EC, data is not lost even when one or more data nodes have failed. The number of node failures that can be tolerated depends on how many parity blocks are calculated. For instance, two simultaneous node failures can be tolerated when using two parity blocks.

When using replication, data is replicated across a given number of nodes to provide durability against one or more nodes going down. The number of replicas for a given volume determines how many node failures can be tolerated.

Figure 6:
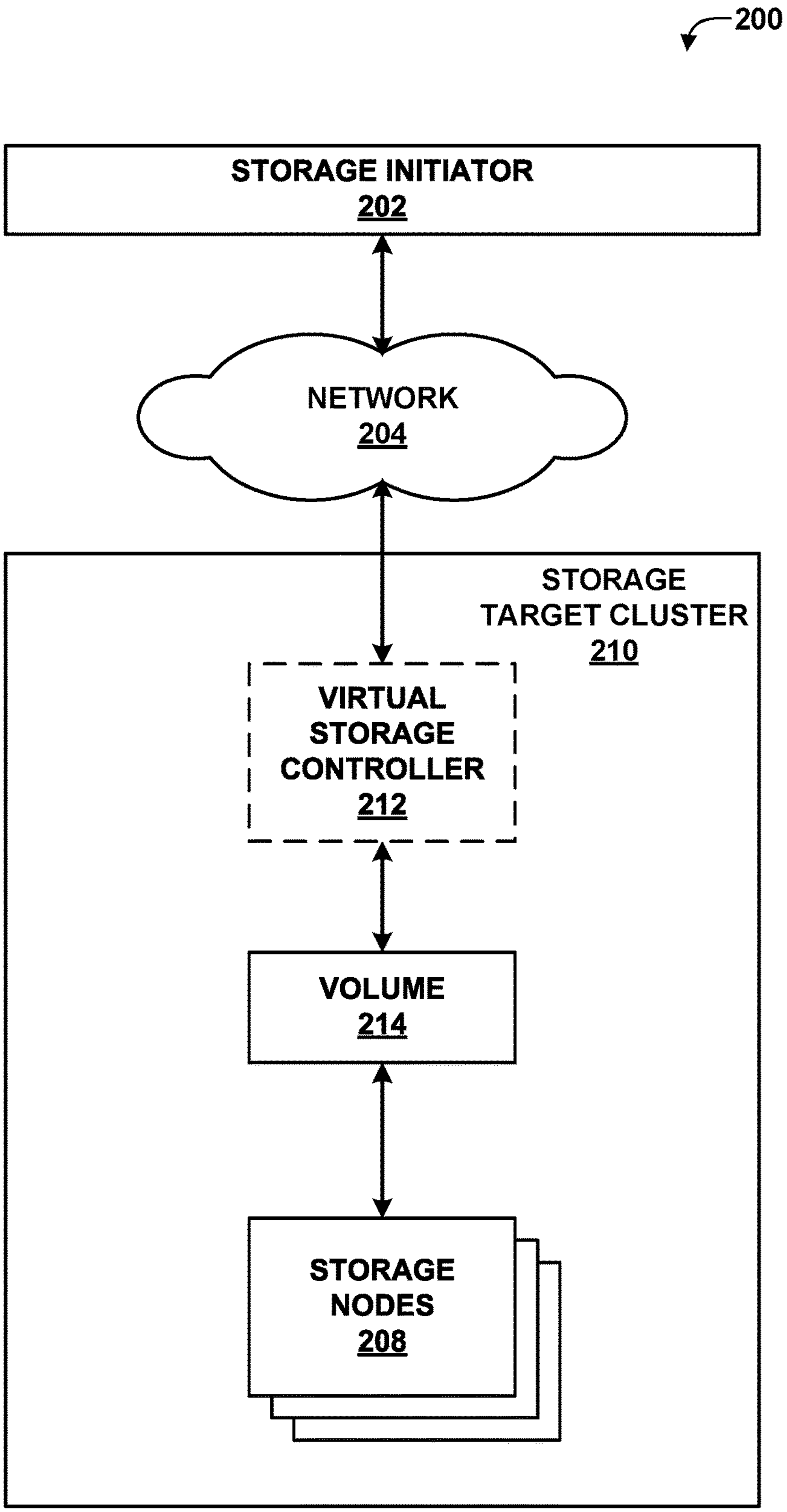
FIG. 6 is a block diagram illustrating an example storage system.

FIG. 6 is a block diagram illustrating an example storage system 200. System 200 includes storage initiator 202, network 204, and storage target cluster 210. Storage target cluster 210 includes a virtual storage controller 212, e.g., instantiated, with attached volume 214 and storage nodes 208. The virtual storage controllers may be created and deleted on selected nodes as needed. The virtual storage controllers may be configured to allow access from any storage initiator, including storage initiator 202. Storage initiator 202 may correspond to storage initiator 24 of FIG. 1. Storage nodes 208 may correspond to storage nodes 162 of FIG. 4.

Storage initiator 202 may access one or more volumes by connecting to associated storage controllers presented by storage target clusters. For example, as shown in FIG. 6, storage initiator 202 may access data of volume 214 through network 204 via virtual storage controller 212 presented by storage target cluster 210. A given storage controller is connected to one storage initiator at any given time. Storage service 156 (FIG. 4) may create the volumes and storage controllers and attach the volumes to the storage controllers as needed.

Figure 7:
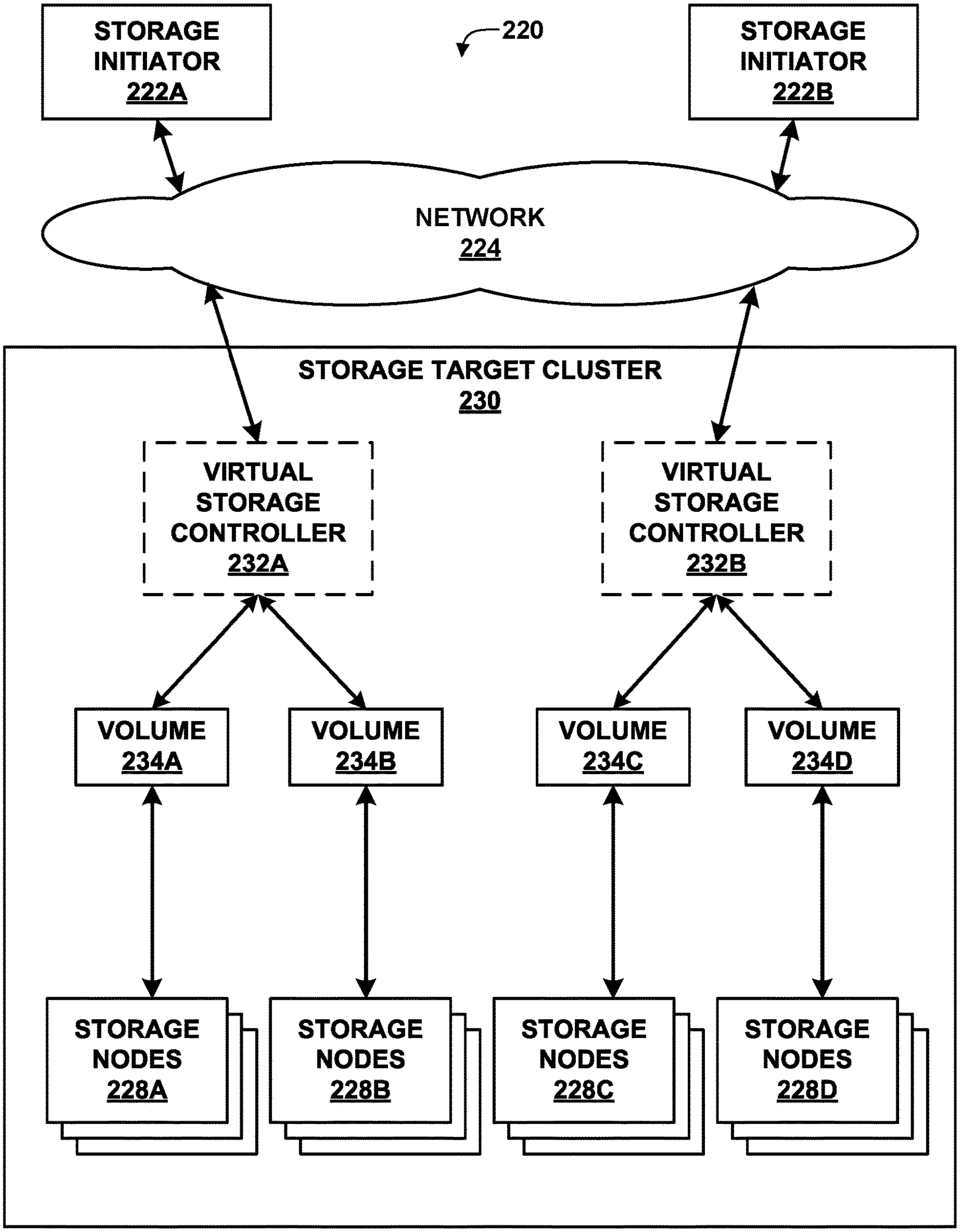
FIG. 7 is a block diagram illustrating another example storage system.

FIG. 7 is a block diagram illustrating another example storage system 220. In the example of system 220, two storage initiators 222A, 222B may access data of four volumes 234A-234D. Storage target cluster 230 provides virtual storage controllers 232A, 232B that may be instantiated on demand by storage services. In the example of FIG. 7, storage initiator 222A may access data of volumes 234A and 234B via virtual storage controller 232A, while storage initiator 222B may access data of volumes 234C and 234D via virtual storage controller 232B. Storage initiators 222A, 222B access data of storage target cluster 230 via network 224. Data of volumes 234A-234D may be stored in their respective set of storage nodes 228.

Figure 8:
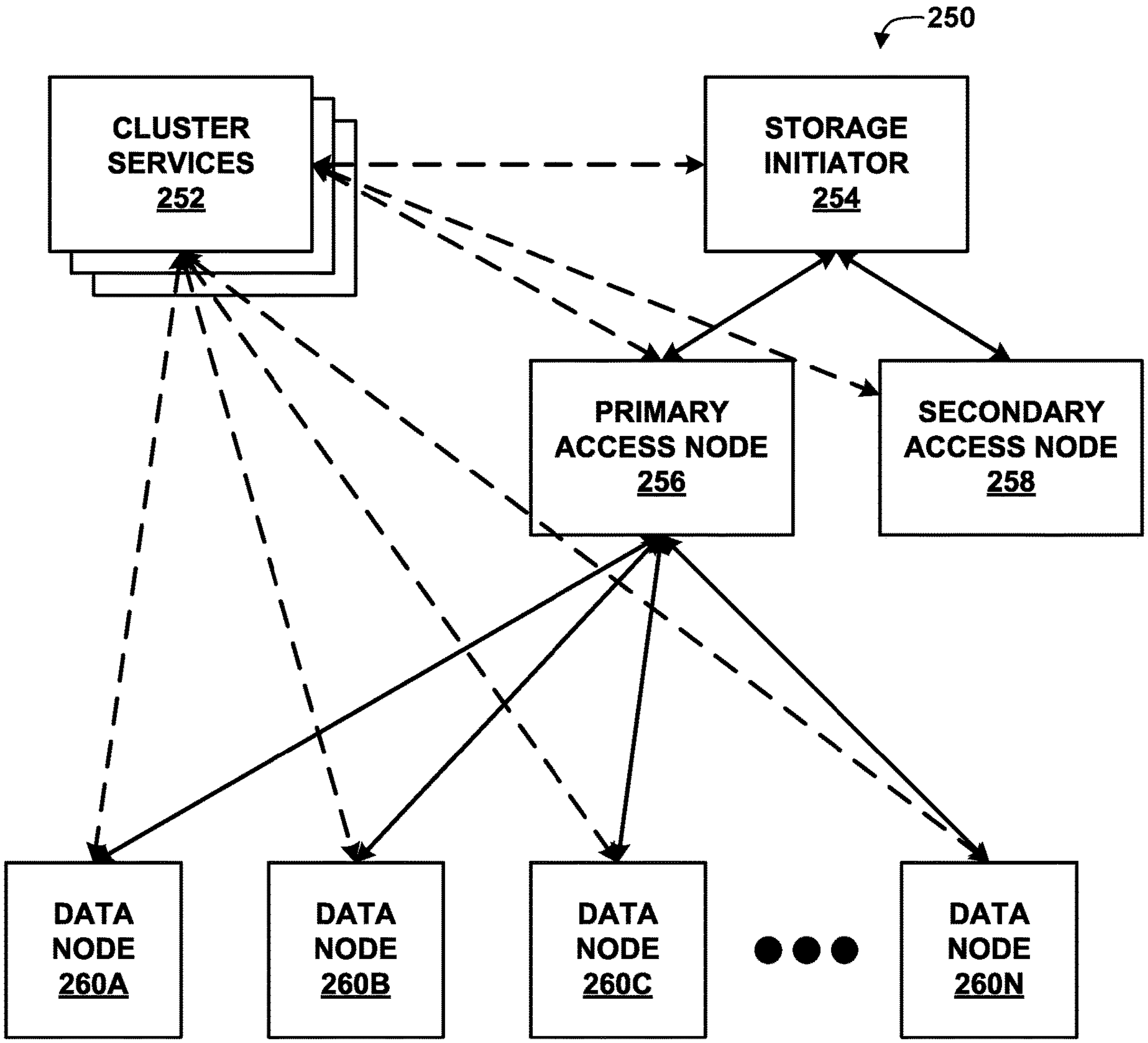
FIG. 8 is a conceptual diagram illustrating an example storage system that may provide high availability for a storage cluster.

FIG. 8 is a conceptual diagram illustrating an example storage system 250 that may provide high availability for a storage cluster. System 250 includes cluster services 252, storage initiator 254, primary access node 256, secondary access node 258, and data nodes 260.

System 250 may implement an approach to high availability that allows a volume to fail-over a virtually unlimited number of times, as long as there are enough nodes and capacity in the cluster to be able to do so. Such an approach can utilize virtual storage controllers and can achieve durability by sharing the data over many storage nodes with redundancy. This design and implementation of HA allows storage initiator 254 to access data of a volume via multiple paths, with each path going through an access node, e.g., primary access node 256. Secondary access node 258 may act as a backup access node to primary access node 256 in case primary access node 256 fails or is otherwise unavailable. The access nodes 256, 258 may act as storage target nodes that allow access to durable storage volumes that are erasure coded or replicated across multiple data nodes. The data nodes 260 may be nodes used by durable storage volumes to store data of the volumes. For a given volume, a storage target node can act as either an access node or a data node or both an access node and a data node.

In the example of FIG. 8, storage initiator 254 connects to both primary access node 256 and secondary storage node 258. These storage target nodes act as access nodes providing access to data of the volume. The actual data for the volume may be stored in the storage target nodes that are acting as data nodes for that volume, e.g., data nodes 260.

Data of the volume can be stored across a number of data nodes 260, the number of which can depend on the durability scheme implemented. For example, there may be a total of six data nodes for an EC scheme of four data blocks and two parity blocks. Every chunk of data may be split into four data blocks and two parity blocks are generated using those four data blocks, and these six blocks are stored in the six data nodes. This EC four data block+two parity block scheme thus allows data to be available even when there are up to two data node failures.

Any storage target node in the cluster can be selected as a primary access node or as a secondary access node for a given volume. The secondary node for a volume should not be the same as the primary node of that volume. There could be other criteria, such as failure domains, when selecting the primary and secondary access nodes as well as the data nodes for a given volume. The number of data nodes and parity nodes for a given volume may be configurable and can include an upper bound. The number of data nodes and parity nodes may be selected based on the storage overhead, cluster size, and the number of simultaneous node failures that can be tolerated.

At any given time, one of the two access nodes may act as a primary node (e.g., primary access node 256) and requests from storage initiator 254 may be served by said primary access node 256. Primary access node 256 has access to the volume data residing in data nodes 260, whereas connections from secondary access node 258 to data nodes 260 are not established unless secondary access node 258 becomes a primary access node. Secondary access node 258 does not service any input/output requests when configured as the secondary access node. However, storage initiator 254 is connected to secondary access node 258 as well as primary access node 256. Cluster services 252 may manage all nodes (illustrated as dashed lines to indicate control plane operations), including the DPU-based storage initiator nodes, e.g., storage initiator 254.

Figure 9:
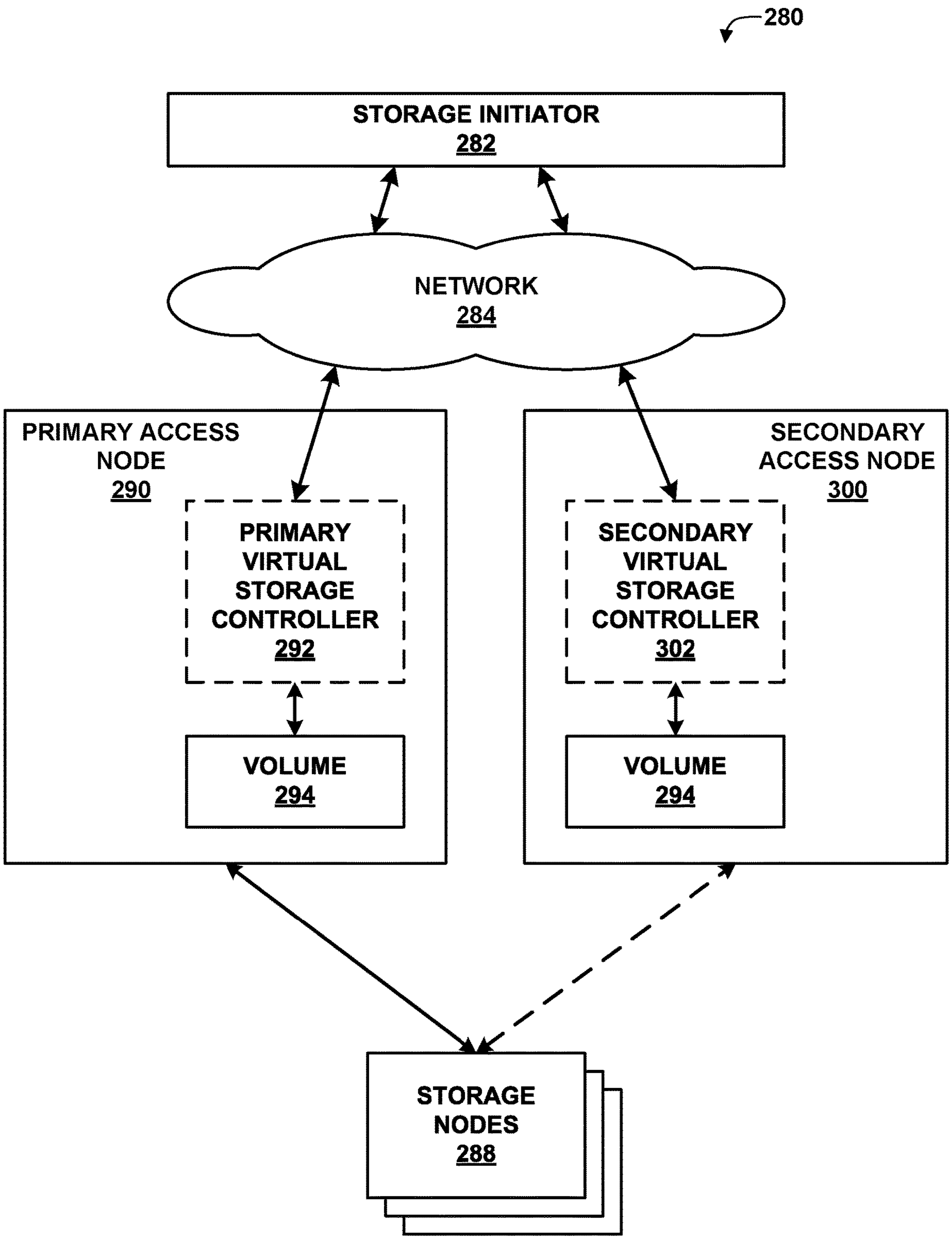
FIG. 9 is a block diagram illustrating an example storage system that may provide high availability for a storage cluster.

FIG. 9 is a block diagram illustrating an example storage system 280 that may provide high availability for a storage cluster. In this example, system 280 includes storage initiator 282, network 284, primary access node 290, secondary access node 300, and storage nodes 288. Primary access node 290 includes primary virtual storage controller 292 and volume 294, and secondary access node 300 includes secondary virtual storage controller 302 and volume 294.

In the example of FIG. 9, primary access node 290 is selected as a primary access node and secondary access node 300 is selected as a secondary access node. As long as primary access node 290 is operating correctly, storage initiator 282 accesses volume 294 through primary access node 290 and primary virtual storage controller 292.

In the event that primary access node 290 goes down or is otherwise unavailable, secondary access node 300 becomes the primary access node, and storage initiator 282 fails over to secondary access node 300. Another node from the storage cluster (not shown in FIG. 9) can then be configured as a new secondary access node.

This same process of failing over to the current secondary access node as a new primary access node and selecting a new secondary access node from the storage cluster may repeat any time the current primary node goes down. A selected new secondary access node may be a previous primary access node that has been repaired and made available. Thus, failover can be performed a nearly unlimited number of times as long as there is enough capacity left in the cluster for rebuilds when needed and a quorum of nodes (e.g., 6 nodes when using 4+2 erasure coding) available in the cluster. Both primary virtual storage controller 292 and secondary virtual storage controller 302 may provide the same volume identity (e.g., volume 294) and any other controller identity that needs to be maintained. This is possible because storage controllers are virtual and can be created or deleted with needed properties on any of the nodes of the data center.

The storage service may ensure that only one path is primary at any given time, thereby avoiding the possibility of storage initiator 282 communicating with both primary access node 290 and secondary access node 300 at the same time. Otherwise, there would be a potential for loss or corruption of data due to the states between the two nodes diverging. To avoid the split-brain situation of both access nodes becoming active, the storage service may ensure that the current secondary is made primary (active) only after confirming that any write input/output operations to the failed primary cannot reach the actual data nodes by cutting off the connections between the failed primary access node and the data nodes. These techniques for durable volume with separation of access and data nodes allows the storage service to avoid this split-brain situation without having to rely on a third party for either the metadata or the confirmation of the primary access node failure. When there is a path change, the information may be passed to storage initiator 282. When storage initiator 282 is also a DPU-based initiator, the host software need not be aware of any path changes as the initiator DPU handles the failover together with the storage service.

When a secondary access node fails, the storage service may select a new secondary node, mount the volume at the new secondary access node, and provide information to storage initiator 282 indicative of the new secondary access node. The data path will not be disrupted in this case as the primary access node is not affected.

The storage target nodes storing data for a volume can be different from the storage target nodes providing access to the volume. In such cases, there need not be any data relocation when a primary access node fails unless the primary access node also hosts a data shard for the volume.

It is unlikely that both primary access node 290 and secondary access node 300 would fail at the same time. However, when this happens, the storage service may wait for one of these access nodes to come back online before initiating a failover, as there might be some input/output commands that have not yet been flushed to the storage devices of storage nodes 288. The primary and secondary access nodes may be kept in different power failure domains to reduce the likelihood of both primary and secondary access nodes going down at the same time. In some examples, there can be multiple secondary nodes for a given volume, which can provide for a more robust system at the expense of additional overhead and traffic in maintaining write data at all of the access nodes.

Figure 10:
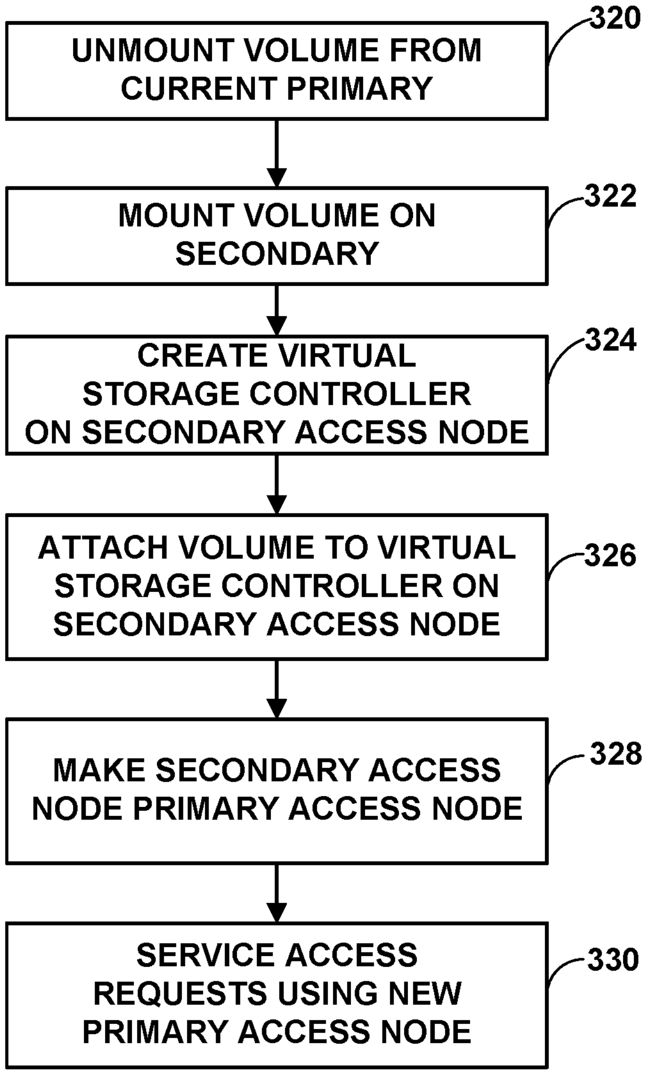
FIG. 10 is a flowchart illustrating an example method of performing a failover process.

FIG. 10 is a flowchart illustrating an example method of performing a failover process. The method of FIG. 10 may be performed by various components of a storage system, e.g., cluster services 154 and storage service 156 of FIG. 4. When performing a failover (e.g., in response to detecting a failure of a primary access node), storage service 156 may initially unmount a volume from the current primary access node (320).

Storage service 156 may then mount the volume to the current secondary access node (322). Storage service 156 may also create a virtual storage controller on the secondary access node (324) and attach the volume to the virtual storage controller on the secondary access node (326). Storage service 156 may then make the secondary access node the primary access node for the volume (328), e.g., providing information to an associated storage initiator indicating that the previous secondary access node is now the primary access node. Thus, the new primary access node may then service access requests received from the storage initiator (330).

Figure 11:
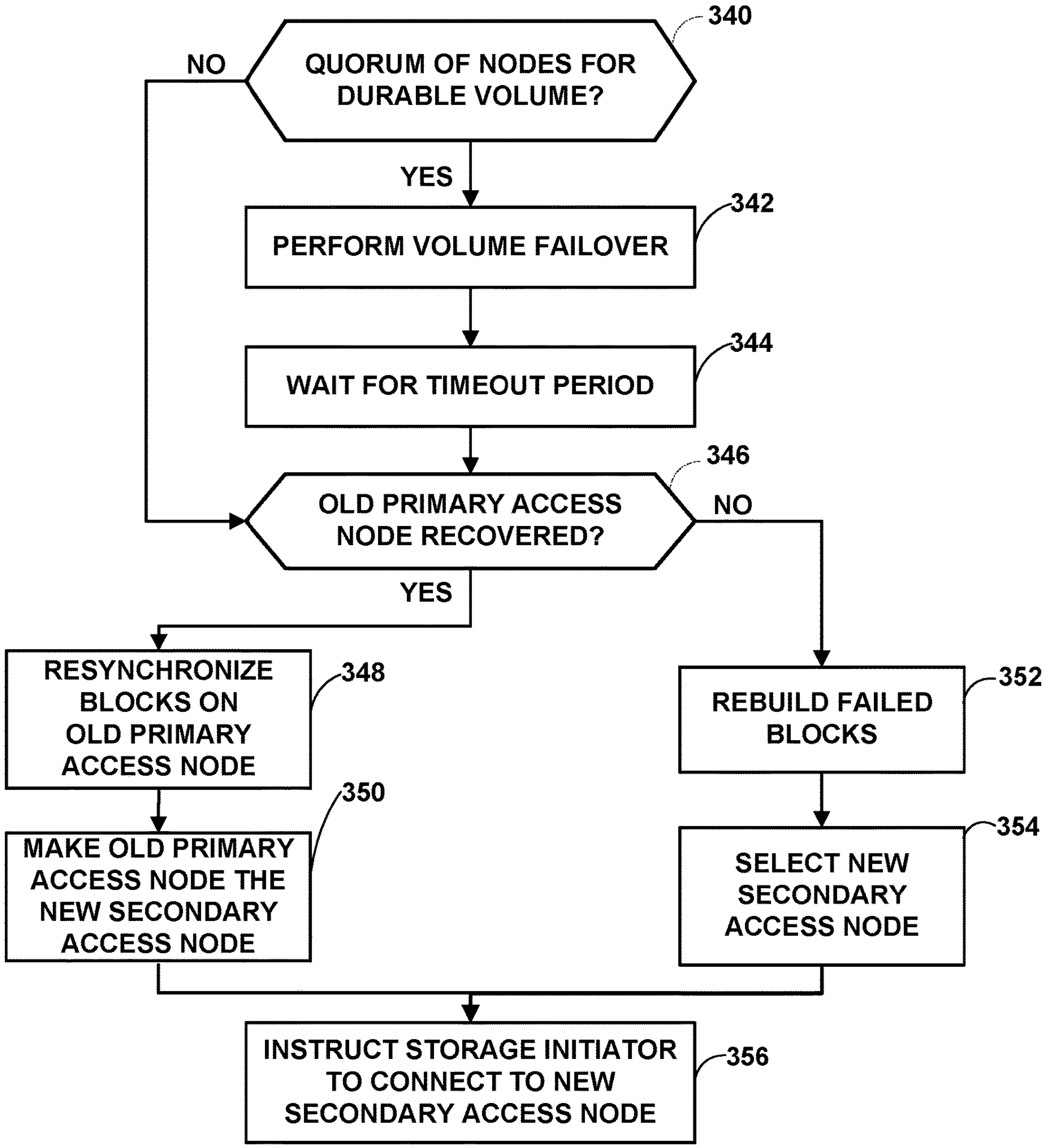
FIG. 11 is a flowchart illustrating an example method of establishing a new secondary access node following a failover to a new primary access node.

FIG. 11 is a flowchart illustrating an example method of establishing a new secondary access node following a failover to a new primary access node. The method of FIG. 11 may be performed by various components of a storage system, e.g., cluster services 154 and storage service 156 of FIG. 4. Initially, storage service 156 may detect that a primary access node for a given durable volume has failed (e.g., that a DPU heartbeat loss has been detected for DPU associated with said primary access node). In response, storage service 156 may determine whether there is a quorum of nodes available for the durable volume (340). If a quorum is present ("YES" branch of 340), storage service 156 may perform a volume failover (342). Volume failover (342) can be performed using various methods, including the method described in FIG. 10. Storage service 156 may then wait for a timeout period (344) and determine whether the old primary has recovered (346).

Following the timeout period (or in the case that there is not a quorum of nodes available for the durable volume following the initial failure of the primary access node ("NO" branch of 340)), if the old primary access node has recovered ("YES" branch of 346), storage service 156 may resynchronize data blocks on the old primary access node (348) and make the old primary access node the new secondary access node (350). On the other hand, if the old primary access node has not recovered within the timeout period ("NO" branch of 346), storage service 156 may rebuild the failed blocks (352) and select a new secondary access node (354). In either case, storage service 156 may instruct the storage initiator to connect to the new secondary access node (356).

If a failed node has crashed or rebooted due to some failure, then the failed node volume state may be lost. Hence, the storage initiator may not be able to access the durable volume through this node anymore. If the primary access node is available and storage service 156 cannot reach it (e.g., due to network failure somewhere between storage service 156 and the node) but the node is still accessible by the storage initiator (e.g., due to management path failure when data and management networks are separate), then storage service 156 may ensure that the storage initiator cannot access the data via this failed node. Storage service 156 may be configured to avoid sending any commands to the primary access node in this case. Storage service 156 may also reach the data nodes of the durable volume and delete the connections from the failed primary access node to the data nodes. As a result, the primary access node would be rendered incapable of sending any further commands from the storage initiator to the data nodes. Thus, these techniques may protect the data center from data corruption or loss due to split brain situations.

Storage service 156 may initiate a resynchronization or rebuild of the data blocks. If data blocks of a data node have failed, and the DPU managing those data blocks does not come back within a certain period of time, storage service 156 may initiate a full rebuild of those data blocks on another data node or data nodes. If the failed data node comes back online within a waiting period, storage service 156 may avoid a full rebuild and instead issue a resynchronization instruction to bring the data blocks up to date with all data writes that have happened since the data block failure.

To select the new secondary access node, storage service 156 may wait for a period of time to see if the failed node comes back online. If the failed node is able to recover within the time period, storage service 156 may use that node as the new secondary access node. However, if the failed node does not come back within the waiting period, storage service 156 may select a new node as a new secondary access node. The selection of the new secondary access node may depend on various factors, such as power failure domains and input/output load. Once the new secondary access node is selected, storage service 156 may mount the volume to the secondary access node in passive mode (or inactive mode) and attached the volume to a newly created storage controller of the secondary access node. Storage service 156 may then indicate to the storage initiator to establish a connection with the newly created secondary storage controller. In the case that storage initiators are not managed by storage service 156, the information may be pulled by storage initiators using a standard discovery service.

Figure 12:
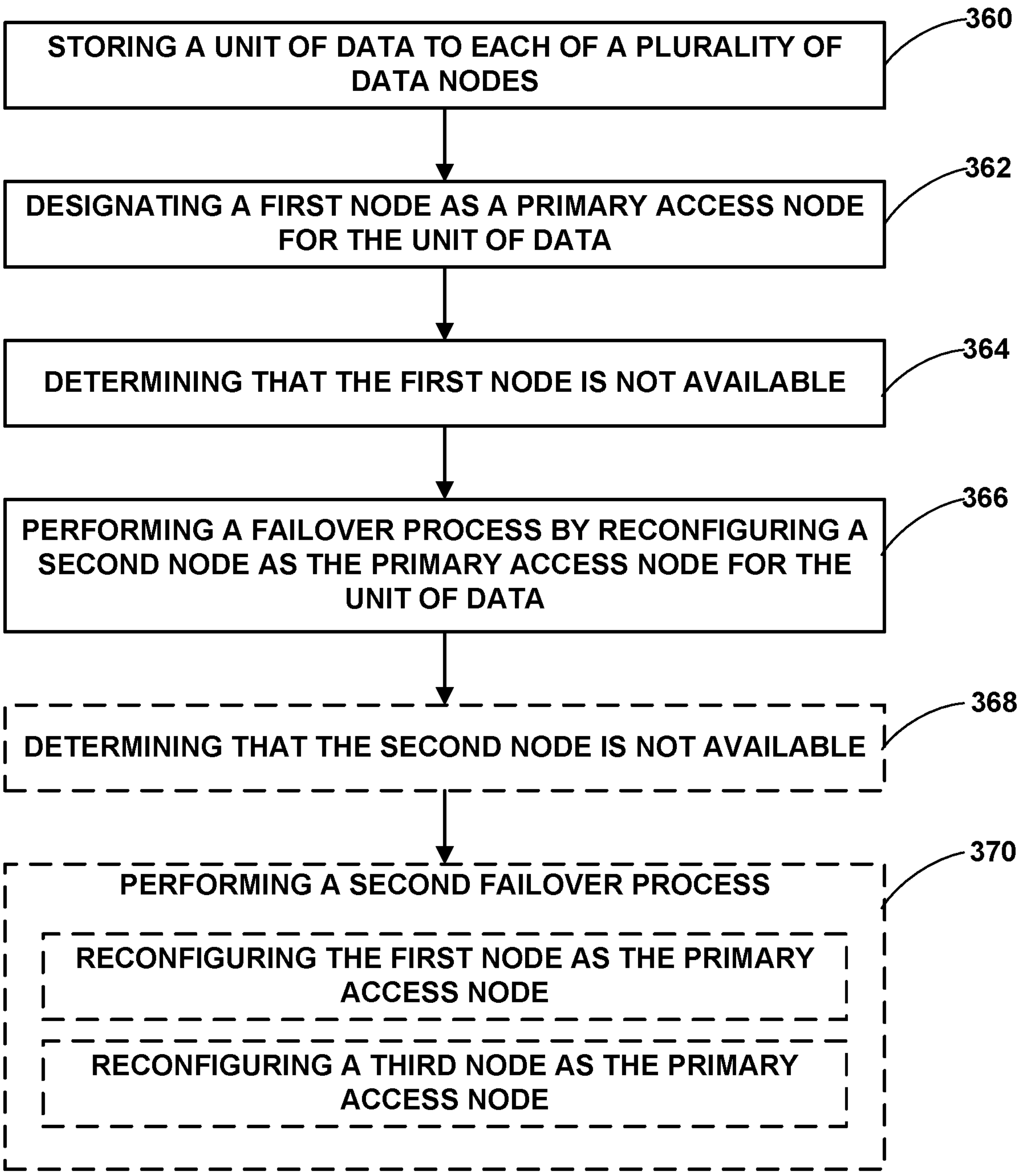
FIG. 12 is a flowchart illustrating an example method of providing access to data of a data center.

FIG. 12 is a flowchart illustrating an example method of providing access to data of a data center. The method includes storing a unit of data to each of a plurality of data nodes (360). The unit of data may be stored in various storage devices associated with the data nodes. The method further includes designating a first node as a primary access node for the unit of data (362). In some examples, a different node is designated as a secondary access node, which represents a backup node to act as the access node in the event that the primary access node fails or is otherwise unavailable.

The method further includes determining that the first node is not available (364). Determination of availability can be performed in various ways. In some examples, periodic heartbeat signals are received from each node. A missed heartbeat signal for a given node indicates that the given node has failed or is otherwise unavailable, such as failure of the node or lost network connectivity. When a heartbeat signal is missed, health of the given node can be checked. If the health of the given node is below a predetermined threshold, it can be determined to be unavailable.

The method further includes performing a failover process (366). The failover process can be performed in various ways, including the methods described above with respect to FIG. 10. For example, in response to the unavailability of the primary access node (e.g., the first node), the failover process can include reconfiguring a second node of the data center as the primary access node for the unit of data, where the second node is different from the first node. In some examples, the failover process includes reconfiguring a secondary access node as the primary access node. In such cases, a new secondary access node can be designated. For example, a first node can be designated as a primary access node, and a second node different from the first node can be designated as a secondary access node. In response to the unavailability of the first node, the second node is reconfigured to be the new primary access node. A third node, different from the first and second nodes, can be designated as the new secondary access node.

The method may optionally include determining that the second node is not available (368) and performing a second failover process (370). The second failover process can be performed in various ways. Due to the unavailability of the primary access node (the second node), the second failover process can include reconfiguring a different node as the primary access node. Depending on the availability of the nodes of the data center, different nodes may be selected. For example, if the first node (the original primary access node) is available, it may be selected and designated as the new primary access node. In some examples, a different, third node is selected and designated as the new primary access node. As described above, the "third node" may be a node that was designated as the new secondary access node.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims. The following paragraphs provide additional support for the claims of the subject application. One aspect provides a method of providing access to data of a data center, the method comprising storing a unit of data to each of a plurality of data nodes of a data center, designating a first node of the data center as a primary access node for the unit of data, the primary access node being configured to service access requests to the unit of data using one or more of the plurality of data nodes, determining that the first node is not available, and performing a failover process by reconfiguring a second node of the data center as the primary access node for the unit of data. In this aspect, additionally or alternatively, the method further comprises receiving a request from a client associated with the unit of data to access the unit of data using the primary access node and, after determining that the first node is not available, providing access to the client to the unit of data via the second node. In this aspect, additionally or alternatively, the failover process is performed by a storage service, and wherein access to the unit of data via the second node is provided by a virtual storage controller unit in response to the failover process. In this aspect, additionally or alternatively, the request from the client to access the unit of data comprises at least one of reading, writing, or modifying the unit of data. In this aspect, additionally or alternatively, the failover process is performed without copying the unit of data when the plurality of data nodes is available. In this aspect, additionally or alternatively, the method further comprises determining that at least one data node of the plurality of data nodes is unavailable, wherein the at least one data node is below a predetermined number and performing a rebuild of the at least one data node that is unavailable during the performing of the failover process. In this aspect, additionally or alternatively, performing the failover process further comprises determining that a first candidate node is not available and reconfiguring a second candidate node as the primary access node, wherein the second candidate node is the second node. In this aspect, additionally or alternatively, the method further comprises determining that a data node of the plurality of data nodes is unavailable, configuring an additional node of the data center, separate from the plurality of data nodes, as a data node for the unit of data, and copying at least a portion of the unit of data to the additional node. In this aspect, additionally or alternatively, the method further comprises monitoring a periodic signal from the primary access node, wherein determining that the primary access node is not available comprises determining that the periodic signal has not been received from the primary access node. In this aspect, additionally or alternatively, the method further comprises determining that the second node is not available and performing a second failover process by reconfiguring the first node as the primary access node for the unit of data.

Another aspect provides a storage system for providing access to data of a data center, the storage system comprising a plurality of data processing units, a plurality of nodes, each node associated with a respective data processing unit of the plurality of data processing units, wherein the storage system is configured to store a unit of data to one or more storage devices of one or more data nodes, wherein the one or more data nodes are nodes within the plurality of nodes, designate a first access node as a primary access node for the unit of data, wherein the first access node is a node within the plurality of nodes different from the one or more data nodes, and wherein the primary access node is configured to service access requests to the unit of data using the one or more data nodes, determine that the primary access node is not available, and perform a failover process by reconfiguring a second access node as the primary access node for the unit of data, wherein the second access node is a node within the plurality of nodes different from the first access node and the one or more data nodes. In this aspect, additionally or alternatively, the storage system is further configured to receive a request from a client associated with the unit of data to access the unit of data using the primary access node and, after determining that the first node is not available, providing access to the client to the unit of data via the second node. In this aspect, additionally or alternatively, the failover process is performed by a storage service, and wherein providing access to the client to the unit of data via the second node is allowed by a virtual storage controller unit of the second node in response to the failover process. In this aspect, additionally or alternatively, performing the failover process further comprises determining that a first candidate node is not available and reconfiguring a second candidate node as the primary access node, wherein the second candidate node is the second access node. In this aspect, additionally or alternatively, the storage system is further configured to determine that the second access node, which is currently designated as the primary access node, is not available, and perform a second failover process by reconfiguring the first access node as the primary access node.

Another aspect provides a method for providing access to data of a data center, the method comprising storing a unit of data to each of a plurality of data nodes of a data center, designating a first node of the data center as a primary access node for the unit of data, the primary access node being configured to service access requests to the unit of data using one or more of the plurality of data nodes, designating a second node of the data center as a secondary access node for the unit of data, determining that the primary access node is not available, and performing a failover process by reconfiguring the second node of the data center as the primary access node for the unit of data by removing connections from the first node to the unit of data, establishing connections from the second node to the unit of data, and designating a node different from the second node as the secondary access node. In this aspect, additionally or alternatively, the method further comprises receiving a request from a client associated with the unit of data to access the unit of data using the primary access node and, after determining that the first node is not available, providing access to the client to the unit of data via the second node. In this aspect, additionally or alternatively, performing the failover process further comprises determining that a first candidate node is not available and reconfiguring a second candidate node as the primary access node, wherein the second candidate node is the second node. In this aspect, additionally or alternatively, the method further comprises determining that a current primary access node is not available and performing a second failover process. In this aspect, additionally or alternatively, performing the second failover process includes designating the first node as the primary access node.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of providing access to data of a data center, the method comprising:

storing a unit of data to each of a plurality of data nodes of a data center;

designating a first node of the data center as a primary access node for the unit of data, the primary access node being configured to service access requests to the unit of data using one or more of the plurality of data nodes;

designating a second node of the data center as a secondary access node for the unit of data, wherein the secondary access node acts as a backup access node in case the primary access node is unavailable;

after designating the second node of the data center as the secondary access node, determining that the first node is not available;

performing a failover process by reconfiguring the second node of the data center as the primary access node for the unit of data, wherein the reconfigured second node can service access requests without relocating data;

before a failure of the second node, designating a third node as the secondary access node;

performing a second failover process; and before a failure of the third node, designating the first node of the data center as the secondary access node.

2. The method of claim 1, further comprising:

receiving a request from a client associated with the unit of data to access the unit of data using the primary access node; and after determining that the first node is not available, providing access to the client to the unit of data via the second node.

3. The method of claim 2, wherein the failover process is performed by a storage service, and wherein access to the unit of data via the second node is provided by a virtual storage controller unit in response to the failover process.

4. The method of claim 2, wherein the request from the client to access the unit of data comprises at least one of reading, writing, or modifying the unit of data.

5. The method of claim 1, wherein the failover process is performed without copying the unit of data when the plurality of data nodes is available.

6. The method of claim 1, further comprising:

determining that at least one data node of the plurality of data nodes is unavailable, wherein the at least one data node is below a predetermined number; and performing a rebuild of the at least one data node that is unavailable during the performing of the failover process.

7. The method of claim 1, wherein performing the failover process further comprises:

determining that a first candidate node is not available; and reconfiguring a second candidate node as the primary access node, wherein the second candidate node is the second node.

8. The method of claim 1, further comprising:

determining that a data node of the plurality of data nodes is unavailable;

configuring an additional node of the data center, separate from the plurality of data nodes, as a data node for the unit of data; and copying at least a portion of the unit of data to the additional node.

9. The method of claim 1, further comprising monitoring a periodic signal from the primary access node, wherein determining that the primary access node is not available comprises determining that the periodic signal has not been received from the primary access node.

10. A storage system for providing access to data of a data center, the storage system comprising:

a plurality of data processing units; and a plurality of nodes, each node associated with a respective data processing unit of the plurality of data processing units, wherein the storage system is configured to:

store a unit of data to one or more storage devices of one or more data nodes, wherein the one or more data nodes are nodes within the plurality of nodes;

designate a first access node as a primary access node for the unit of data, wherein the first access node is a node within the plurality of nodes different from the one or more data nodes, and wherein the primary access node is configured to service access requests to the unit of data using the one or more data nodes;

designate a second access node of the plurality of nodes as a secondary access node for the unit of data, wherein the secondary access node acts as a backup access node in case the primary access node is unavailable;

after designating the second access node of the plurality of nodes as the secondary access node, determine that the primary access node is not available;

perform a failover process by reconfiguring the second access node as the primary access node for the unit of data, wherein the second access node is a node within the plurality of nodes different from the first access node and the one or more data nodes, wherein the reconfigured second node can service access requests without relocating data;

before a failure of the second access node, designate a third access node as the secondary access node;

perform a second failover process; and before a failure of the third access node, designate the first access node as the secondary access node.

11. The storage system of claim 10, wherein the storage system is further configured to:

receive a request from a client associated with the unit of data to access the unit of data using the primary access node; and after determining that the first access node is not available, providing access to the client to the unit of data via the second access node.

12. The storage system of claim 10, wherein the failover process is performed by a storage service, and wherein providing access to the client to the unit of data via the second access node is allowed by a virtual storage controller unit of the second access node in response to the failover process.

13. The storage system of claim 10, wherein performing the failover process further comprises:

determining that a first candidate node is not available; and reconfiguring a second candidate node as the primary access node, wherein the second candidate node is the second access node.

14. A method for providing access to data of a data center, the method comprising:

storing a unit of data to each of a plurality of data nodes of a data center;

designating a first node of the data center as a primary access node for the unit of data, the primary access node being configured to service access requests to the unit of data using one or more of the plurality of data nodes;

designating a second node of the data center as a secondary access node for the unit of data, wherein the secondary access node acts as a backup access node in case the primary access node is unavailable;

after designating the second node of the data center as the secondary access node, determining that the primary access node is not available;

performing a failover process by:

reconfiguring the second node of the data center as the primary access node for the unit of data, wherein the reconfigured second node can service access requests without relocating data, and wherein reconfiguring the second node comprises:

removing connections from the first node to the unit of data;

establishing connections from the second node to the unit of data; and before a failure of the second node, designating a third node as the secondary access node;

performing a second failover process; and before a failure of the third node, designating the first node of the data center as the secondary access node.

15. The method of claim 14, further comprising:

receiving a request from a client associated with the unit of data to access the unit of data using the primary access node; and after determining that the first node is not available, providing access to the client to the unit of data via the second node.

16. The method of claim 14, wherein performing the failover process further comprises:

determining that a first candidate node is not available; and reconfiguring a second candidate node as the primary access node, wherein the second candidate node is the second node.

17. The method of claim 14, further comprising:

determining that a current primary access node is not available; and after determining that the current primary access node is not available, performing the second failover process.

* * * * *